US009497047B2

(12) United States Patent  
Josiam et al.

(10) Patent No.: US 9,497,047 B2  
(45) Date of Patent: Nov. 15, 2016

(54) METHODS AND APPARATUS FOR SOUNDING CHANNEL OPERATION IN MILLIMETER WAVE COMMUNICATION SYSTEMS

(71) Applicant: Samsung Electronics Co., Ltd., Suwon-si, Gyeonggi-do (KR)

(72) Inventors: Kaushik Josiam, Fort Worth, TX (US); Rakesh Taori, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 14/320,018

(22) Filed: Jun. 30, 2014

(65) Prior Publication Data

US 2015/0009951 A1 Jan. 8, 2015

Related U.S. Application Data

(60) Provisional application No. 61/842,268, filed on Jul. 2, 2013.

(51) Int. Cl.
*H04L 25/02* (2006.01)
*H04B 7/06* (2006.01)
*H04L 5/00* (2006.01)

(52) U.S. Cl.
CPC ......... *H04L 25/0224* (2013.01); *H04B 7/0617* (2013.01); *H04L 5/0051* (2013.01)

(58) Field of Classification Search
CPC ............ H04L 25/0224; H04L 5/0048; H04B 7/0617

See application file for complete search history.

(56) References Cited

U.S. PATENT DOCUMENTS

2009/0190488 A1* 7/2009 Hochwald ............ H04B 7/0617
370/252
2009/0274226 A1 11/2009 Mondal et al.
(Continued)

FOREIGN PATENT DOCUMENTS

WO WO 2009/099931 A1 8/2009

OTHER PUBLICATIONS

International Search Report dated Oct. 14, 2014 in connection with International Application No. PCT/KR2014/005916, 4 pages.
(Continued)

*Primary Examiner* — Chandrahas Patel
*Assistant Examiner* — Lan Huong Truong

(57) ABSTRACT

A method includes configuring a first sounding channel to be an uplink sounding slot. The uplink sounding slot has at least one OFDM symbol in an uplink sub-frame in order to carry UL-SRSs corresponding to at least one transmit beam of a first set of transmit beams in a first sounding channel set of sub-bands. The first sounding channel set of sub-bands includes sub-bands that cover a first data bandwidth. The method includes transmitting, to an MS, a first UL sounding configuration message that sets a sounding sub-band bitmap value to a maximum specifiable value and indicates UL-SRS placement in the first sounding channel set of sub-bands. The method includes, receiving through the first sounding channel set of sub-bands from the MS, the UL-SRSs corresponding to at least the one transmit beam of the first set of transmit beams for channel estimation over the first data bandwidth.

16 Claims, 24 Drawing Sheets

(56) References Cited

U.S. PATENT DOCUMENTS

| | | | |
|---|---|---|---|
| 2010/0173639 A1* | 7/2010 | Li | H04B 7/0695 |
| | | | 455/450 |
| 2010/0255790 A1* | 10/2010 | Farajidana | H04B 17/26 |
| | | | 455/69 |
| 2011/0164489 A1 | 7/2011 | Papasakellariou et al. | |
| 2011/0171964 A1* | 7/2011 | Lin | H04L 5/0023 |
| | | | 455/450 |
| 2012/0243501 A1 | 9/2012 | Vook et al. | |
| 2012/0302254 A1* | 11/2012 | Charbit | H04W 4/005 |
| | | | 455/456.1 |
| 2013/0028241 A1 | 1/2013 | Wang et al. | |
| 2013/0058239 A1* | 3/2013 | Wang | H04B 7/0417 |
| | | | 370/252 |
| 2013/0070623 A1* | 3/2013 | Chun | H04L 5/0007 |
| | | | 370/252 |
| 2013/0222182 A1* | 8/2013 | Nakasato | H04L 27/2613 |
| | | | 342/368 |

OTHER PUBLICATIONS

Written Opinion of the International Searching Authority dated Oct. 14, 2014 in connection with International Application No. PCT/KR2014/005916, 5 pages.

* cited by examiner

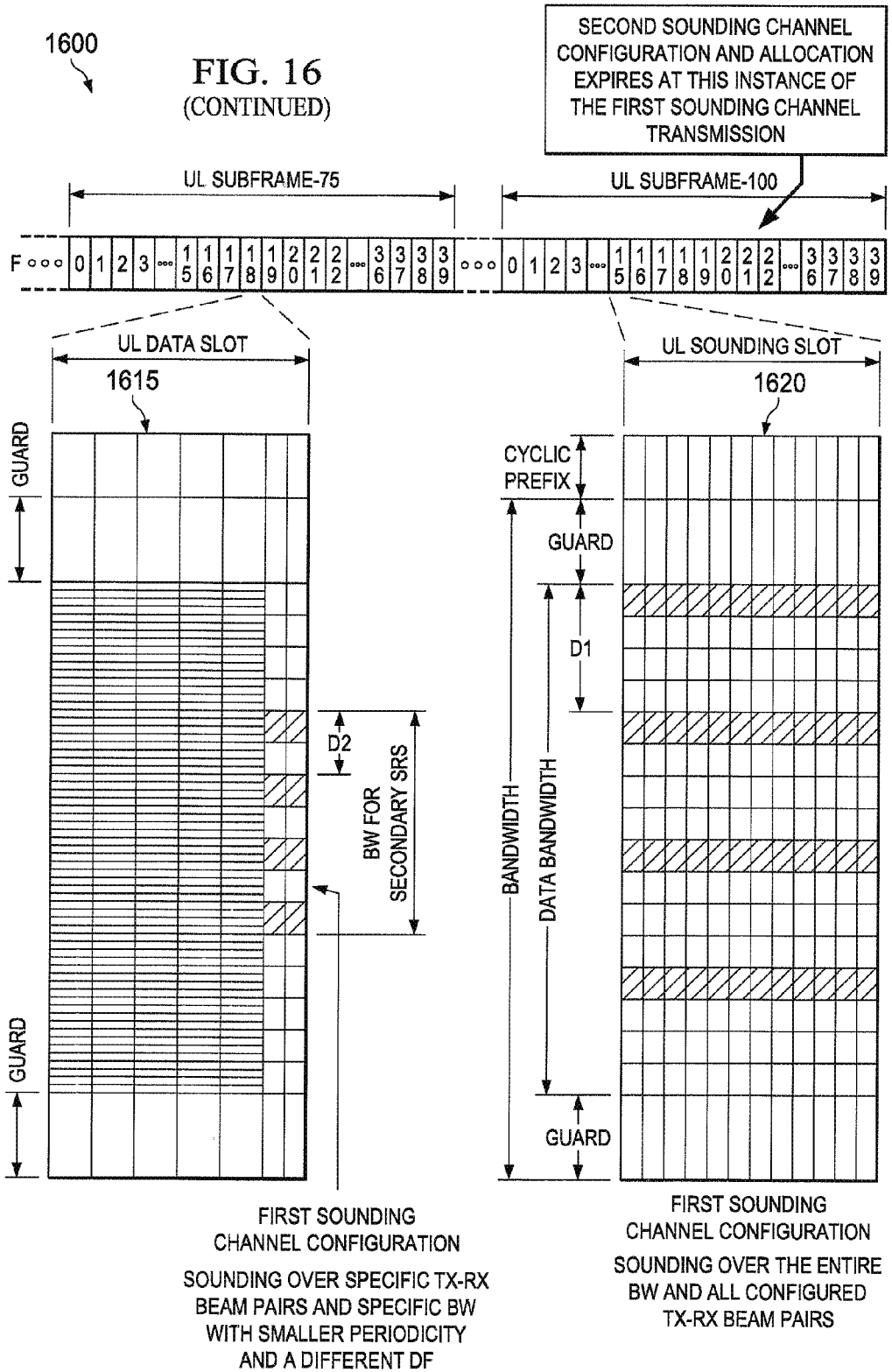

METHODS AND APPARATUS FOR SOUNDING CHANNEL OPERATION IN MILLIMETER WAVE COMMUNICATION SYSTEMS

CROSS-REFERENCE TO RELATED APPLICATION(S) AND CLAIM OF PRIORITY

This application claims priority under 35 U.S.C. §119(e) to U.S. Provisional Patent Application No. 61/842,268 filed on Jul. 2, 2013 and entitled "METHODS AND APPARATUS FOR SOUNDING CHANNEL OPERATION IN MILLIMETER WAVE COMMUNICATION SYSTEMS." The above-identified patent document is hereby incorporated by reference in its entirety.

TECHNICAL FIELD

This disclosure relates generally to wireless communications and, more specifically, to methods and apparatus for sounding channel operation in millimeter wave communication systems.

BACKGROUND

In cellular and other wireless communication systems, sensing a channel's quality for transmissions between a mobile station and a base station is used to identify channels with the highest channel quality. Improving the sensing of the channel quality for wireless communication channels can lead to improved wireless communications between mobile stations and base stations.

SUMMARY

In a first example, a method for use by a base station (BS) in a wireless network is provided. The method includes configuring a first sounding channel to be an uplink sounding slot. The uplink sounding slot has at least one orthogonal frequency-division multiplexing (OFDM) symbol in an uplink sub-frame in order to carry one or more uplink sounding reference symbols (UL-SRSs) corresponding to at least one transmit beam of a first set of transmit beams in a first sounding channel set of sub-bands. The first sounding channel set of sub-bands includes one or more sub-bands that cover a first data bandwidth. The method also includes transmitting, to a mobile station (MS), a first UL sounding configuration message that sets a sounding sub-band bitmap value to a maximum specifiable value and indicates UL-SRS placement in the first sounding channel set of sub-bands. The method further includes receiving, through the first sounding channel set of sub-bands from the MS, the one or more UL-SRSs corresponding to at least the one transmit beam of the first set of transmit beams for channel estimation over the first data bandwidth.

In a second example, a BS for use in a wireless network is provided. The BS includes at least one processing device that is configured to configure a first sounding channel to be an uplink sounding slot. The uplink sounding slot includes at least one OFDM symbol in an uplink sub-frame in order to carry one or more UL-SRSs corresponding to at least one transmit beam of a first set of transmit beams in a first sounding channel set of sub-bands. The first sounding channel set of sub-bands includes one or more sub-bands that cover a first data bandwidth. The at least one processing device is also configured to initiate transmission, to an MS, of a first UL sounding configuration message configured to set a sounding sub-band bitmap value to a maximum specifiable value and indicate UL-SRS placement in the first sounding channel set of sub-bands. The at least one processing device is further configured to receive, through the first sounding channel set of sub-bands from the MS, the one or more UL-SRSs corresponding to at least the one transmit beam of the first set of transmit beams for channel estimation over the first data bandwidth.

In a third example, a method for use by an MS in a wireless network is provided. The method includes receiving, from a BS, a first uplink (UL) sounding configuration message that sets a sounding sub-band bitmap value to a maximum specifiable value and indicates UL-SRS placement in a first sounding channel set of sub-bands associated with a first sounding channel. The first sounding channel set of sub-bands includes one or more sub-bands that cover a first data bandwidth. The first sounding channel is configured to be an uplink sounding slot having at least one OFDM symbol in an uplink sub-frame in order to carry one or more UL-SRSs corresponding to at least one transmit beam of a first set of transmit beams in the first sounding channel set of sub-bands. The method also includes transmitting, through the first sounding channel set of sub-bands to the BS, the one or more UL-SRSs corresponding to at least the one transmit beam of the first set of transmit beams for channel estimation over the first data bandwidth.

In a fourth example, an MS for use in a wireless network is provided. The MS includes at least one processing device configured to receive, from a BS, a first UL sounding configuration message configured to set a sounding sub-band bitmap value to a maximum specifiable value and indicate UL-SRS placement in a first sounding channel set of sub-bands associated with a first sounding channel. The first sounding channel set of sub-bands includes one or more sub-bands that cover a first data bandwidth. The first sounding channel is configured to be an uplink sounding slot having at least one OFDM symbol in an uplink sub-frame in order to carry one or more UL-SRSs corresponding to at least one transmit beam of a first set of transmit beams in the first sounding channel set of sub-bands. The at least one processing device is also configured to initiate transmission, through the first sounding channel set of sub-bands to the BS, of the one or more UL-SRSs corresponding to at least the one transmit beam of the first set of transmit beams for channel estimation over the first data bandwidth.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic communication device.

Figure 1:
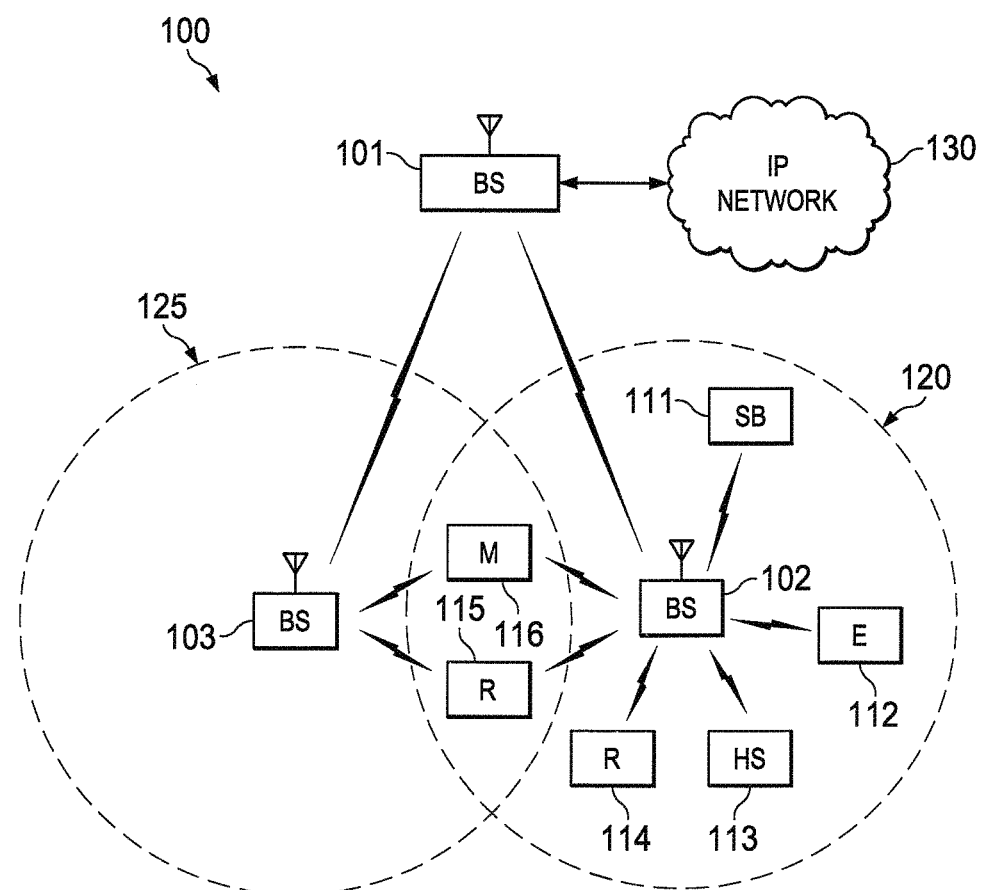
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an base station (BS) 101, an BS 102, and an BS 103. The BS 101 communicates with the BS 102 and the BS 103. The BS 101 also communicates with at least one Internet Protocol (IP) network 130, such as the Internet, a proprietary IP network, or other data network.

Depending on the network type, other well-known terms may be used instead of "base station" or "BS," such as "eNodeB" or "eNB" or "access point." These terms may be used interchangeably and are used in this patent document to refer to network infrastructure components that provide wireless access to mobile station (MS). Also, depending on the network type, other well-known terms may be used instead of "mobile station" or "MS," such as "user equipment," "UE," "subscriber station," "remote terminal," "wireless terminal," or "user device." These terms may be used interchangeably and are used in this patent document to refer to remote wireless equipment that wirelessly accesses an BS, whether the MS is a mobile device (such as a mobile telephone or smartphone) or is normally considered a stationary device (such as a desktop computer or vending machine).

The BS 102 provides wireless broadband access to the network 130 for a first plurality of MSs within a coverage area 120 of the BS 102. The first plurality of MSs includes an MS 111, which may be located in a small business (SB); an MS 112, which may be located in an enterprise (E); an MS 113, which may be located in a WiFi hotspot (HS); an MS 114, which may be located in a first residence (R); an MS 115, which may be located in a second residence (R); and an MS 116, which may be a mobile device (M) like a cell phone, a wireless laptop, a wireless PDA, or the like. The BS 103 provides wireless broadband access to the network 130 for a second plurality of MSs within a coverage area 125 of the BS 103. The second plurality of MSs includes the MS 115 and the MS 116. In some embodiments, one or more of the BSs 101-103 may communicate with each other and with the MSs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, various devices in the network 100 (such as BSs and MSs) support techniques for channel estimation.

Although FIG. 1 illustrates one example of a wireless network 100, various changes may be made to FIG. 1. For example, the wireless network 100 could include any number of BSs and any number of MSs in any suitable arrangement. Also, the BS 101 could communicate directly with any number of MSs and provide those MSs with wireless broadband access to the network 130. Similarly, each BS 102-103 could communicate directly with the network 130 and provide MSs with direct wireless broadband access to the network 130. Further, the BS 101, 102, and/or 103 could provide access to other or additional external networks, such as external telephone networks or other types of data networks.

Figure 2:
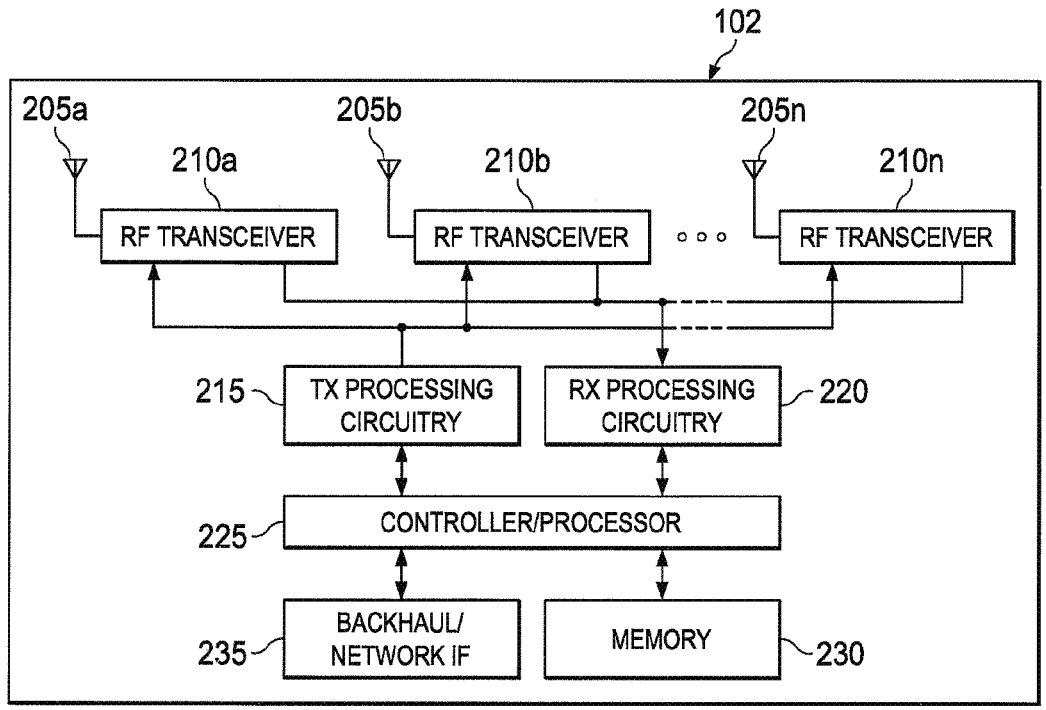
FIG. 2 illustrates an example base station (BS) according to this disclosure.

FIG. 2 illustrates an example BS 102 according to this disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple RF transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by MSs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting 5G, LTE, or LTE-A), the interface 235 could allow the BS 102 to communicate with other BS over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

Figure 3:
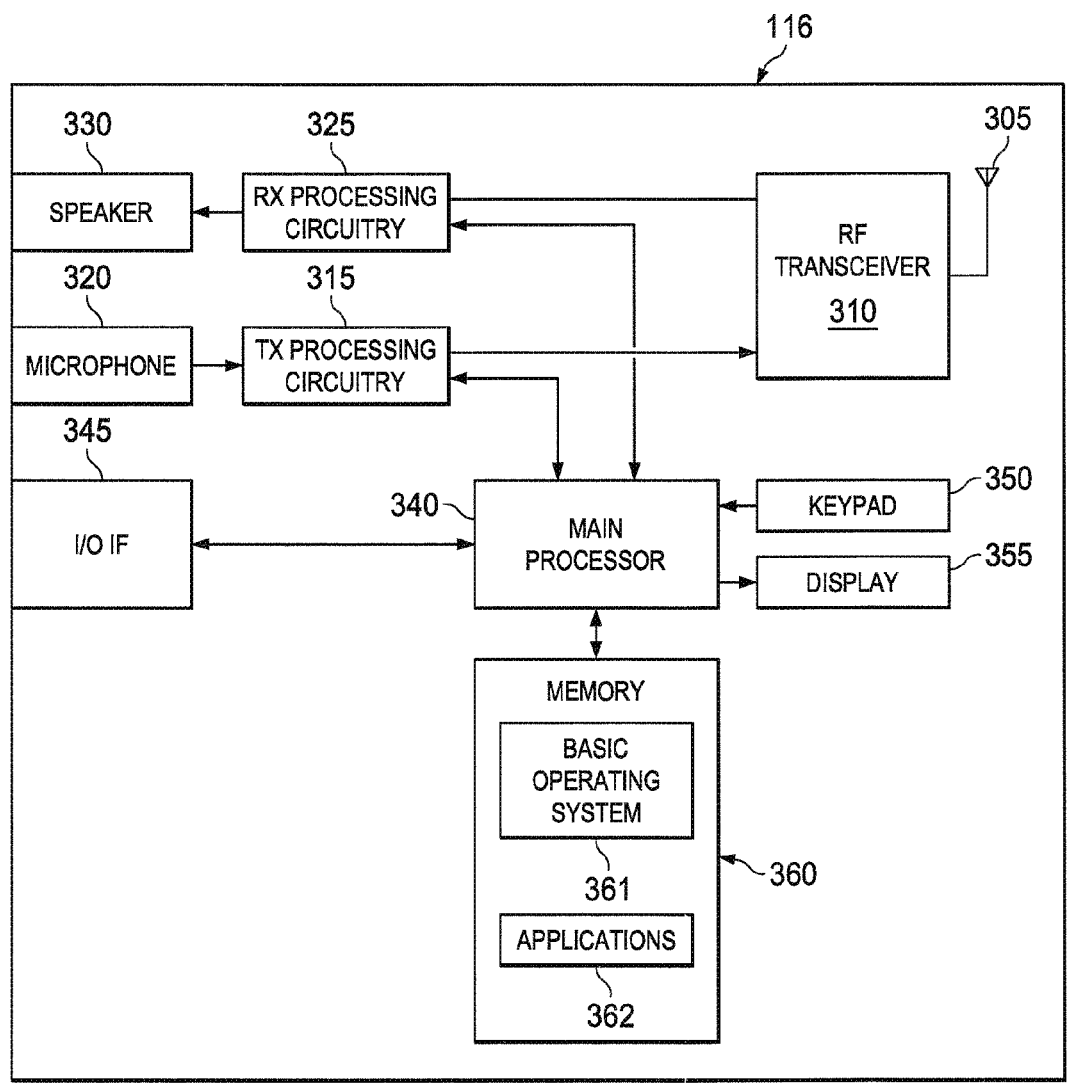
FIG. 3 illustrates an example mobile station (MS) according to this disclosure.

FIG. 3 illustrates an example MS 116 according to this disclosure. The embodiment of the MS 116 illustrated in FIG. 3 is for illustration only, and the MSs 111-115 of FIG. 1 could have the same or similar configuration. However, MSs come in a wide variety of configurations, and FIG. 3 does not limit the scope of this disclosure to any particular implementation of a MS.

As shown in FIG. 3, the MS 116 includes an antenna 305, a radio frequency (RF) transceiver 310, transmit (TX) processing circuitry 315, a microphone 320, and receive (RX) processing circuitry 325. The MS 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an BS of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the MS 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for receiving a sounding configuration message from a BS and transmitting one or more UL-SRSs to a BS. The main processor 340 can move data into or out of the memory 360 as required by an executing process. In some embodiments, the main processor 340 is configured to execute the applications 362 based on the OS program 361 or in response to signals received from BSs or an operator.

The main processor 340 is also coupled to the I/O interface 345, which provides the MS 116 with the ability to connect to other devices such as laptop computers and handheld computers. The I/O interface 345 is the communication path between these accessories and the main controller 340.

The main processor 340 is also coupled to the keypad 350 and the display unit 355. The operator of the MS 116 can use the keypad 350 to enter data into the MS 116. The display 355 may be a liquid crystal display or other display capable of rendering text and/or at least limited graphics, such as from web sites. The keypad 350 could also be incorporated into the display 355, such as when the display 355 represents a touchscreen.

The memory 360 is coupled to the main processor 340. Part of the memory 360 could include a random access memory (RAM), and another part of the memory 360 could include a Flash memory or other read-only memory (ROM).

Although FIG. 3 illustrates one example of MS 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the MS 116 configured as a mobile telephone or smartphone, MSs could be configured to operate as other types of mobile or stationary devices.

In cellular and other wireless systems, uplink channel sounding can be used for sensing channel quality for transmissions from a MS to a BS. Reference symbols (RSs) known to both the BS and MS can be placed in a configured time-frequency resource and transmitted at known intervals from the mobile station for systematic channel sounding. The BS can configure a physical sounding channel, which in the case of an Orthogonal Frequency Division Multiple Access (OFDMA) based cellular system can involve a set of sub-carriers in an OFDM symbol for an MS. In addition to the physical resource, the BS can indicate the periodicity, the multiplexing type, and other parameters for the MS to transmit the sounding channel. The MS can place the sounding reference symbols (SRSs) at the configured resource locations and transmit them. The BS can receive the SRSs and process them to quantify the channel quality on the uplink. This assessment of the uplink channel quality can be used for scheduling uplink data transmissions. While this mechanism is specifically described for a cellular system, the same process can be followed for other types of communication systems.

Figure 4:
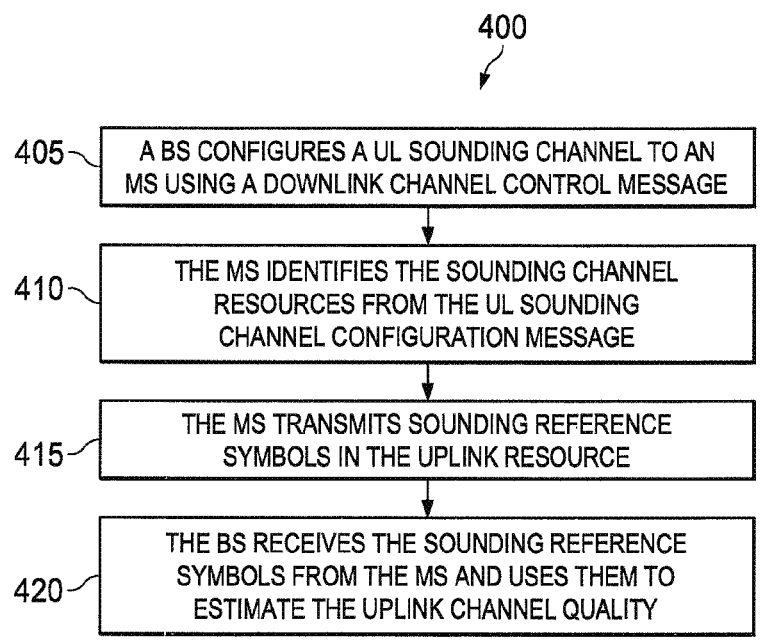
FIG. 4 illustrates an example flow diagram of a method for uplink channel sounding used to sense channel quality according to this disclosure.

FIG. 4 illustrates an example flow diagram of a method 400 for uplink channel sounding used to sense channel quality according to this disclosure. At step 405, a BS configures a UL sounding channel to an MS using a downlink channel control message. At step 410, the MS identifies the sounding channel resources from the UL sounding channel configuration message. At step 415, the MS transmits sounding references symbols in the uplink sounding resource. At step 420, the BS receives the sounding reference symbols from the MS and uses the sounding reference symbols to estimate the uplink channel quality.

Channel sounding can be one of the primary mechanisms for determining an uplink channel quality indication (CQI) in both frequency and time division duplex-based cellular systems. In time division duplex systems with calibrated antennas, the uplink channel quality can be translated to a downlink channel estimate. This downlink channel estimate can be used to schedule closed loop downlink multiple input, multiple output (MIMO) transmissions. Sounding RS transmissions can be used for time frequency synchronization, as well.

Multiple mobile stations' SRSs can be separated in time, frequency or code. MSs scheduled on the same OFDM symbol can multiplex their SRSs on different subcarriers. This can be known as decimation separation. MSs can also transmit their SRSs on the same subcarriers but using SRSs made up of different codes/sequence that have low cross-correlation properties. Such code-based multiplexing of SRSs can be called sequence separation. In a cellular network, both decimation separation and sequence separation can be employed to support MSs in a variety of environments. When applied, decimation separation and sequence separation may not be applied over the same time-frequency resource but can be applied over orthogonal resources.

Cellular systems can be expected to evolve from 4G (LTE, 802.16m) to 5G, which promises even larger data rates (up to 100 times greater). A 5G system can use millimeter wave bands in place of current PCS microwave bands used in 4G systems. The millimeter wave frequencies can be an order of magnitude greater than PCS bands. Propagation in millimeter wave bands can be different due to propagation losses over wireless, which is much larger than what is observed in the microwave bands. With the larger wavelengths, the sizes of antennas used to transmit millimeter waves can be much smaller compared to those used for microwave bands. However, the smaller antennas can be packed in an area comparable to the antenna area for a microwave band. When this antenna array is "operated" synchronously, the antenna array can form a beam whose high gain can make up for the higher propagation losses. Operating the antenna array synchronously can require transmitting the same signal over antennas with different phase shifts. The phase shifts can include path length differences for a transmitted wave from a given antenna measured with respect to a reference antenna in the array. Phase shifts for an antenna array can be called analog weight vectors.

For millimeter wave cellular systems, antennas of a transmitter (such as of an MS or a BS) can be arranged as an array and can be connected through different phase shifters to an analog processing chain that has power amplifiers and other components in this pathway. The analog processing chain can be preceded by a digital baseband chain, which can contain an OFDMA processing pathway. The analog and digital baseband chains can be connected through a digital-to-analog converter at the transmitter. The receiver can also have an antenna array connected to an analog chain containing low noise amplifiers through phase shifters. The analog chain can be connected to the digital processing chain through an analog-to-digital converter. There can be one or more digital baseband transmit and receive chains at the transmitter and receiver. Each of these digital baseband chains can be connected to the same antenna array using components that combine signals from multiple baseband chains. In some embodiments, each baseband chain can be connected to different antenna arrays.

Figure 5:
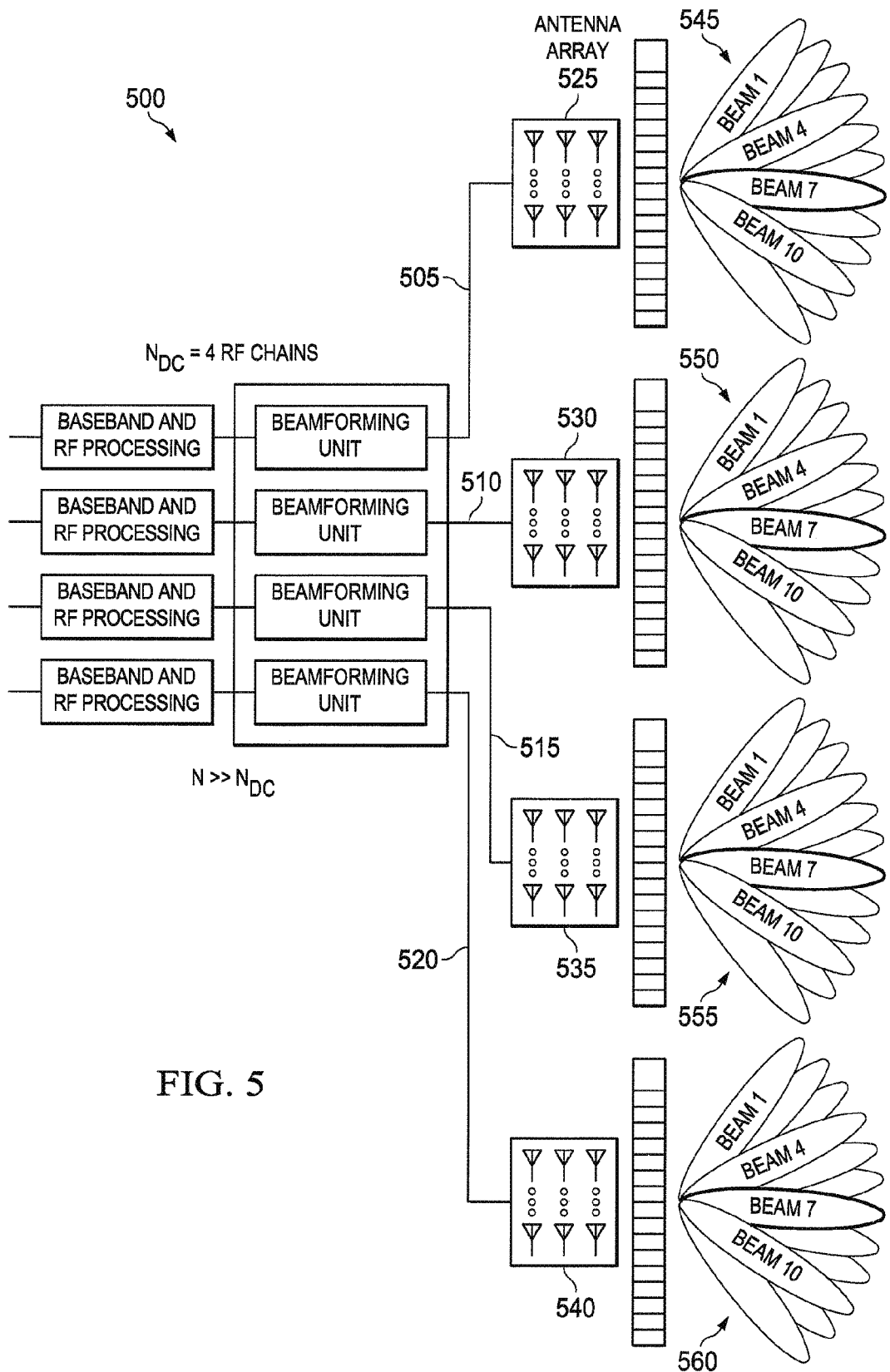
FIG. 5 illustrates an example diagram of a millimeter wave transmitter according to this disclosure.

FIG. 5 illustrates an example diagram of a millimeter wave transmitter according to this disclosure. As illustrated in FIG. 5, the millimeter wave transmitter 500 can include four digital baseband chains 505, 510, 515, and 520 connected to its own antenna array 525, 530, 535, and 540. In 4G systems, the numbers of reference symbols used for transmission can be directly proportional to the number of transmit antennas. Despite having a large number of antennas compared to 4G systems, the number of reference symbols in a millimeter wave system may not be proportional to the number of antennas in the array. Instead, the number of reference symbols can depend on the number of different spatial beams that beamforming can support. Beamforming can support N spatial beams to be formed at each of the antenna arrays 545, 550, 555, and 560, where N is typically smaller than the number of antennas in the array. However, because beamforming can support a lesser number of spatial beams than antennas in an array, additional processing constraints can be placed on the system. The number of digital baseband chains $N_{DC}$ can determine the number of parallel processes that the transmitter or receiver is capable of. In practical systems, $N_{DC}$<N, where $N_{DC}$ is the number of digital baseband chains and N is the number of spatial beams. Thus, a large number of spatial beams can be supported by multiplexing the spatial beams in time rather than at the same time.

Figure 6:
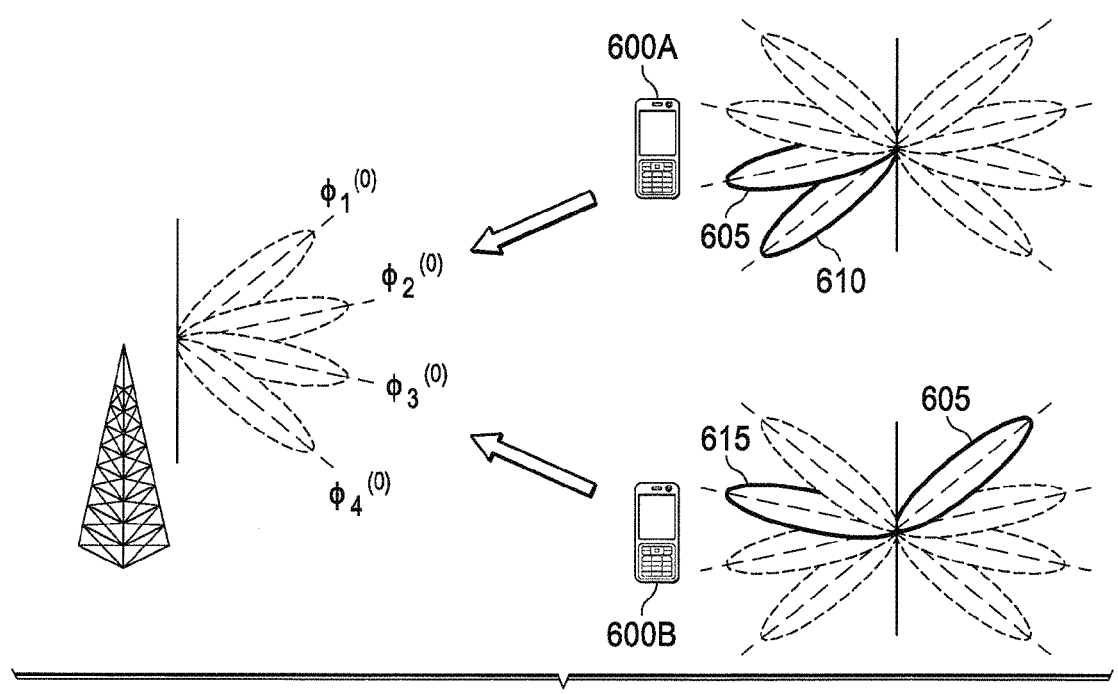
FIG. 6 illustrates an example diagram where mobile stations transmit sounding reference symbols on pre-selected beams according to this disclosure.

In some embodiments, a system can include a sounding mechanism that involves the configuration, transmission, and reception of UL-SRSs in cases where the BS has $N_{DC}^{BS}$ number of digital baseband chains, where each digital chain supports $N_b^{BS}$ spatial beams and the MS has $N_{DC}^{MS}$ digital chains that support $N_b^{MS}$ spatial beams. FIG. 6 illustrates an example diagram where mobile stations 600A and 600B transmit sounding reference symbols on pre-selected beams 605, 610, 615, and 620 according to this disclosure. Here, the configuration and transmission are focused on transmitting UL-SRSs on a subset $N_b^{MS,s}$ of the total $N_b^{MS}$ transmit beams at the MS and the reception is focused on receiving all or a subset of $N_b^{BS}$ receive beams.

Figure 7:
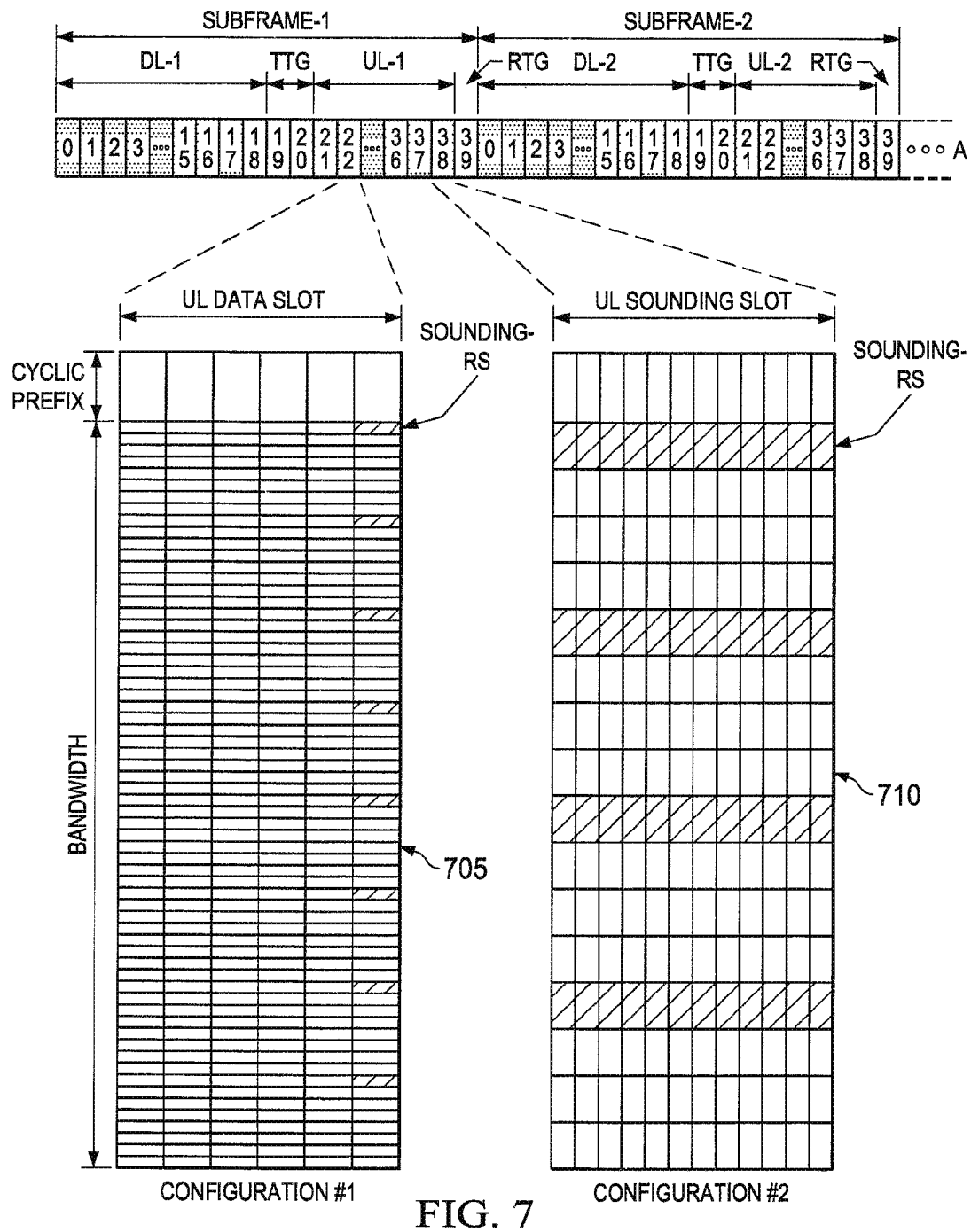
FIG. 7 illustrates an example diagram of a sub-frame with different configurations for multiplexing uplink sounding reference signals according to this disclosure.
Figure 7:
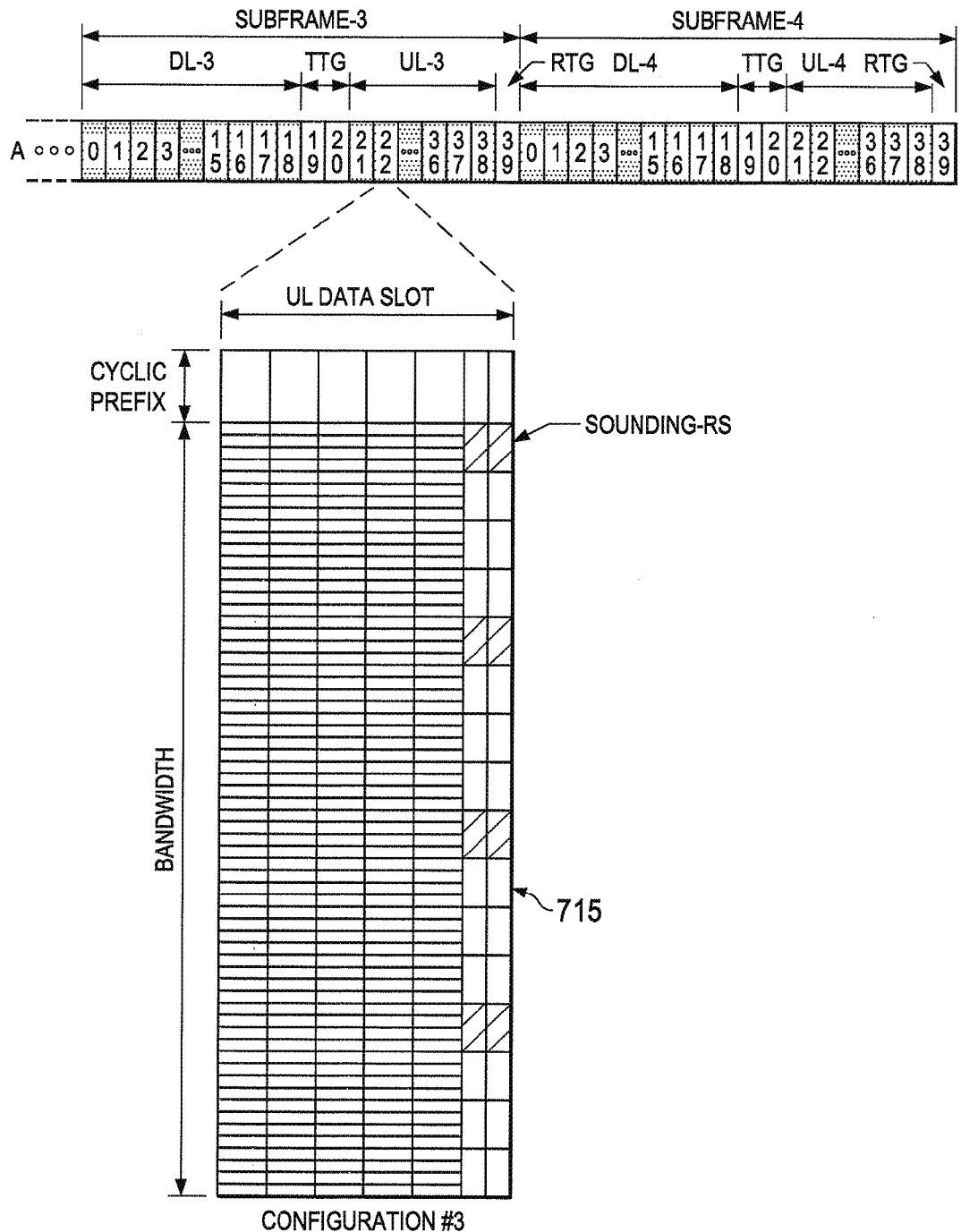

Different configurations for the UL sounding slot can enable the transmission and reception of UL-SRSs with different beam pairs. FIG. 7 illustrates an example diagram of a sub-frame with different configurations for multiplexing uplink sounding reference signals according to this disclosure. The BS can configure a UL sounding slot configuration 710 and the last OFDM symbol of a UL data slot configuration 705 on different UL slots of a given sub-frame. However, the BS may not use all configurations in different uplink slots of a given sub-frame. The BS can indicate this UL sounding configuration using a broadcast message to all MSs.

The BS can schedule an MS to transmit UL-SRSs using any one of the specified configurations for the sounding channel. The BS can specify the configuration, transmission type, periodicity, and other information in the UL sounding configuration message to enable UL-SRS transmission at the MS. When configuring the UL-SRSs for an MS, the BS can indicate the number of transmit beams $N_b^{MS,s}$ that the MS should use to send the reference symbols, the number of times the UL-SRSs corresponding to a specific transmit beam may need to be repeated in addition to indicating the bandwidth of the SRS, the periodicity with which the sounding process is to be repeated, and the timing offset in units of sub-frames from when the SRS is to be transmitted. Table 1 illustrates an example UL-SRS configuration message that carries the indicators on a downlink control channel.

TABLE 1

| Syntax | Size (bits) | Notes |
| --- | --- | --- |
| UL_Sounding_Configuration_Command( ){ | — | — |
| Command type | 4 | Indicates that this command configures UL sounding |

TABLE 1-continued

| Syntax | Size (bits) | Notes |
| --- | --- | --- |
| Sounding slot configuration* | 1 | If the UL-SRS slot is defined |
| If (Sounding slot configuration == 0){ | | |
| Sounding sub-frame indicator | 2 | Indicates the sounding sub-frame. Sub-frames carrying the sounding subframe are renumbered from zero |
| Sounding sub-band bitmap | Variable Max. DEF | FFT size dependent |
| If (multiplexingType == 0){ | | |
| Decimation offset d | 5 | Unique decimation offset |
| }else{ | | |
| Cyclic time shift m | 5 | Unique cyclic shift |
| } | | |
| Periodicity (p) | 3 | 0b000 = single command, not periodic or terminate periodicity, if no other parameter has changed. Otherwise repeat sounding once per $2^{p-1}$ frames, where p is the decimal value of the periodicity field |
| Number of transmit beams for UL-SRS transmission ($N_b^{MS, s}$)* | 2 | 0b00 - not allowed. Decimal value of the field is used. |
| Number of repetitions of the UL-SRS per transmission beam ($N_{rep}^{SRS}$)* | Variable Max. DEF | The decimal value of the field indicates the number of times the UL-SRS corresponding to an transmit beam is to be repeated |
| Power boosting | 1 | 0b0: no power boosting<br>0b1: 3 dB power boosting |
| Padding | Variable | |
| } | | |

With reference to Table 1, syntax fields with an * can indicate items specified to accommodate analog beamforming and scanning for different transmit-receive beam pairs.

Figure 8:
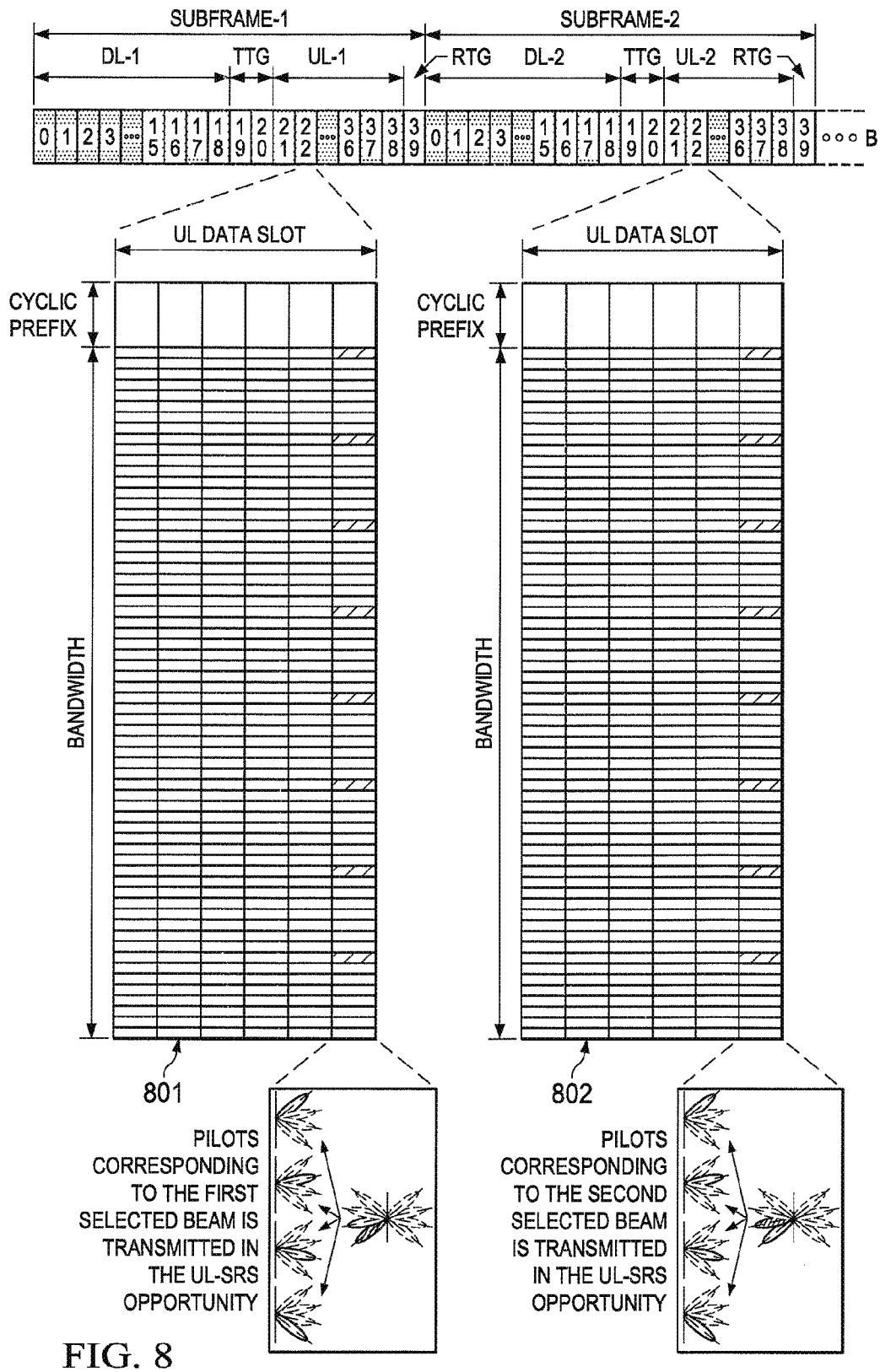
FIG. 8 illustrates an example diagram of uplink sounding reference symbol (UL-SRS) transmission for multiple transmit beams when the SRS sounding is multiplexed along with data in an orthogonal frequency-division multiplexing (OFDM) symbol of a data slot according to this disclosure.
Figure 8:
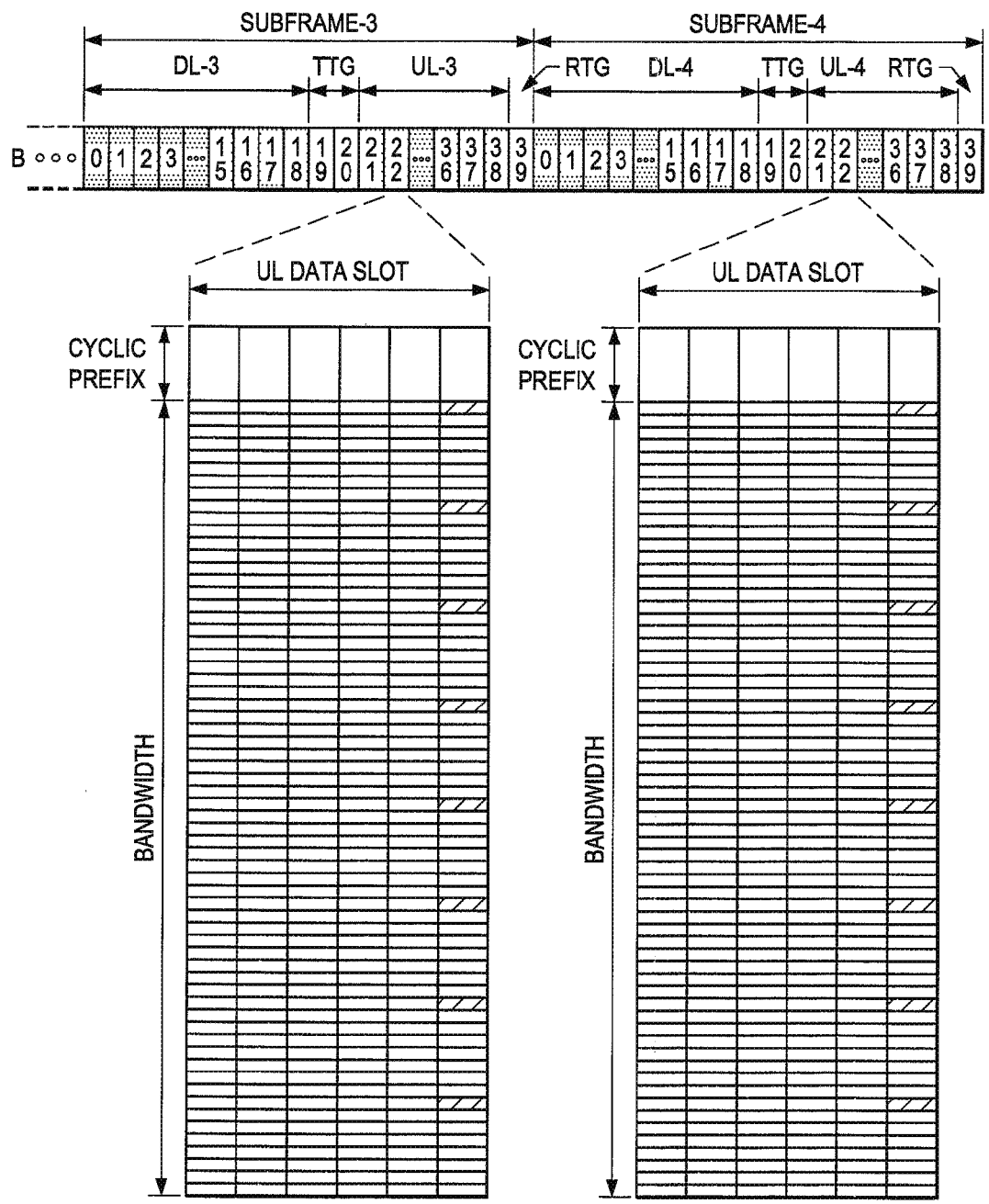

If the BS configures an MS to use UL data slot configuration 705 or 715 as illustrated in FIG. 7 or if the BS sets the "Sounding Slot Configuration" field to 0 in the UL Sounding Configuration message, the MS can transmit the UL-SRS in multiple successive instances (slots/sub-frames) such that UL-SRS can be multiplexed to enable a scanning of multiple transmit and receive beam pairs. For example, with a UL-SRS multiplexing configuration where UL data slot configuration 705 is allowed on UL slot 22 in every sub-frame and an uplink sounding slot on slot 38 set to repeat every subframe. FIG. 8 illustrates an example diagram of UL-SRS transmission for multiple transmit beams when the SRS sounding is multiplexed along with data in an OFDM symbol of a data slot according to this disclosure. If an MS with a UL sounding configuration message contains Sounding Slot Configuration=0, Periodicity(p)=100, Number of transmit beams for UL-SRS transmission ($N_b^{MS,s}$)=2, and Number of repetitions of the UL-SRS per transmission beam ($N_{rep}^{SRS}$)=1, the MS can configure to transmit UL-SRS for a given transmit beam once in the first UL-SRS transmit opportunity in a sub-frame 801 and then the UL-SRS for a second transmit beam in the next UL-SRS transmit opportunity in the succeeding sub-frame 802. Once the MS has transmitted all the UL-SRSs in succeeding SRS multiplexing instances, the MS can use the periodicity parameter to identify the sub-frame for the next round of UL-SRS transmission. The periodicity parameter can be larger than the number of SRS transmission opportunities used to transmit per configuration.

In some embodiments, configuration, transmission, and reception of the UL-SRSs from the MS to the BS for a communication system can focus on at least three aspects: 1) configuration of the physical sounding channel resources that accommodate beamformed transmissions, 2) a BS operation including mechanisms for informing the MS (via broadcast and unicast signaling) the configuration of the sounding channel and the parameters for UL-SRS transmission on the allocated physical resources, and 3) MS transmission schemes to comply with the prescribed parameters and schedule to transmit the UL-SRS on the UL sounding channel and the associated BS behavior to receive and process the UL-SRS.

A communication system can include a cellular system operating in millimeter wave frequencies using the time division duplex (TDD) mode where uplink and downlink can use different time slots on the same carrier frequency. A communication system can also include a cellular system operating in millimeter wave frequencies using the frequency division duplex (FDD) mode where the uplink and downlink use different carrier frequencies and all time slots. Since the carrier frequency and bandwidth for UL and DL can be the same for TDD systems, the knowledge of the downlink channel can be leveraged to choose the beams on which UL-SRS is transmitted. In FDD systems, however, channel reciprocity may not be assumed because different carrier frequencies can be used for UL and DL. Accordingly, the uplink CQI can be obtained/estimated entirely from the uplink SRS. In at least some embodiments, the uplink CQI must be obtained/estimated entirely from the uplink SRS. Since UL-SRS transmission can be an essential part of FDD systems for obtaining UL CQI at the BS, updated and novel procedures can be used for configuration and operation at millimeter wave frequencies. The use of analog beamforming and millimeter wave carrier frequencies can be used to enable estimation of UL CQI within the coherence time of the channel.

To estimate the channel quality, the best RF and baseband precoders over a physical resource unit (PRU) to be scheduled can be located. In some embodiments, however, assuming UL transmissions from an MS are from a single digital chain, UL-SRS can be used to find the preferred analog weight vectors (RF precoders) using the following optimization function:

$$W_{RF}^{BS*}, W_{RF}^{MS*} = \arg \max_{\forall W_{RF}^{BS}, W_{RF}^{MS}} \sum_f \|W_{RF}^{BS} H_f W_{RF}^{MS}\|^2$$

Figure 9:
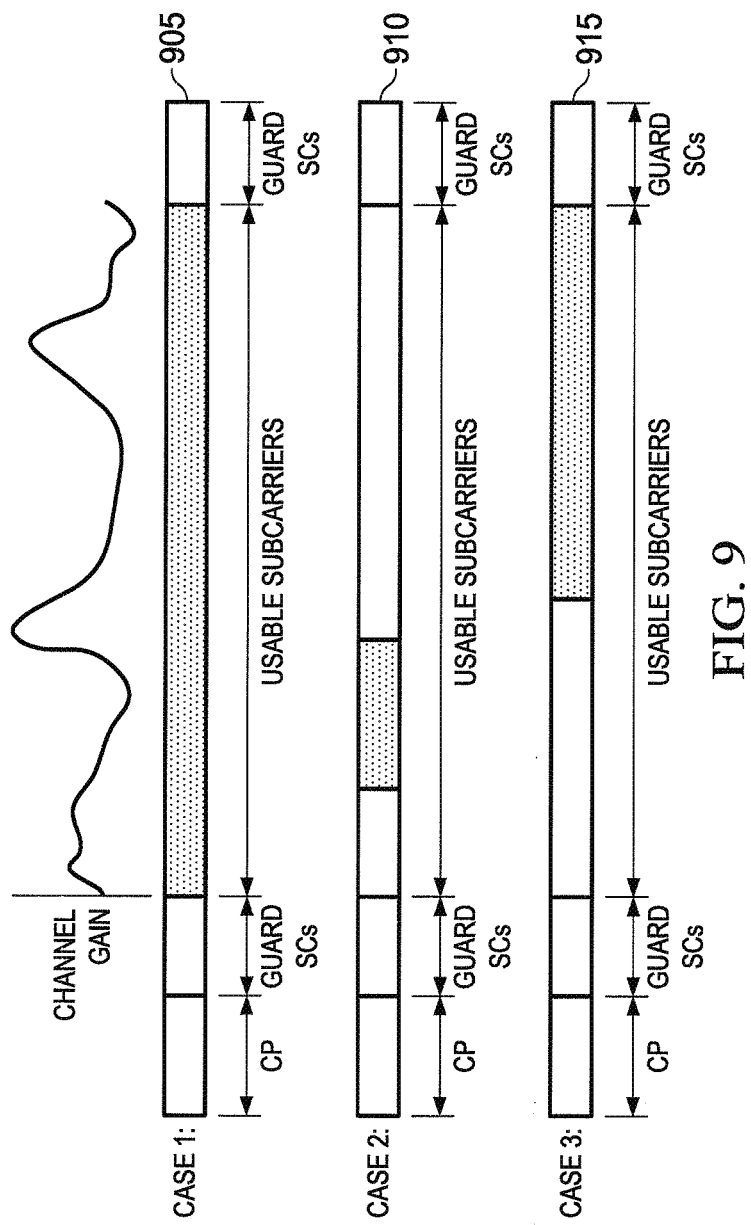
FIG. 9 illustrates an example diagram of different analog weight vectors with uplink SRS carried over different sub-channels according to this disclosure.

FIG. 9 illustrates an example diagram of different analog weight vectors with uplink SRS carried over different sub-channels according to this disclosure. For each of cases 905, 910 and 915, the optimum choice of $W_{RF}^{BS*}$, $W_{RF}^{MS*}$ can be different. For example, with cases 910 and 915 where uplink SRS is carried over sub-channels, UL CQI over the usable subcarriers can result in increased sounding channel overhead when compared to case 905 because of the inherent limitations due to analog beamforming where the analog beams can be changed only at the beginning of an OFDM symbol period. This limitation in cases 910 and 915 can translate to needing a few OFDM symbols transmitting UL-SRS in order to compute UL-CQI for all sub-channels for the same TX-RX beam pair.

Coherence time can depend on the observed Doppler frequency, which is likely to be acute in millimeter wave frequencies. For an MS traveling at 3 kilometers per hour, the observed Doppler $D_s$ at a carrier frequency of 28 GHz can be:

$$D_s = \frac{vf_c}{c} = \frac{3 \times 1000 \times 28 \times 10^9}{3600 \times 3 \times 10^8} = 77.77$$

The coherence time corresponding to the Doppler can be approximated as $$T_c \approx \frac{1}{4D_s} = 3.21 \text{ ms.}$$

Based on the above equation, for 1 ms subframe lengths, the channel can be assumed to be coherent for about 3 sub-frames. It should be noted that the scheduling unit can be a slot of duration 25 μs, which can mean that there are about 40 slots per sub-frame, giving the same scheduling duration as current 4G systems. With a 1 UL sounding slot per sub-frame configuration and 33% BW at each sounding opportunity, three sub-frames can be used to acquire UL CQI over all usable bandwidth. In some embodiments, the UL CQI can be used to schedule UL transmissions only after the third sub-frame.

Figure 10:
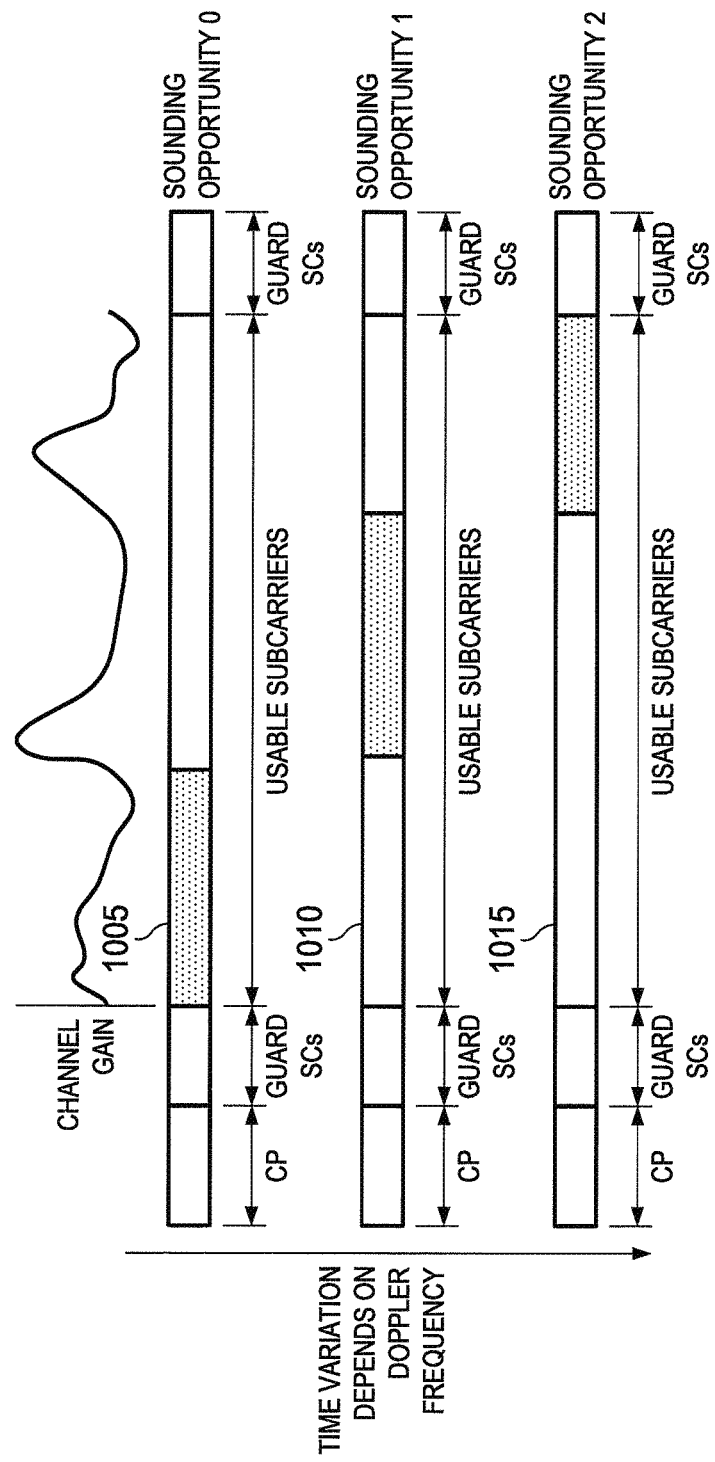
FIG. 10 illustrates an example diagram of multiple sounding opportunities for sounding over different bandwidths according to this disclosure.

FIG. 10 illustrates an example diagram of multiple sounding opportunities 1005, 1010, and 1015 for sounding over different bandwidths according to this disclosure. In some embodiments where the coherence time can only last three sub-frames, the UL CQI estimated using SRS transmitted as illustrated FIG. 10 can be stale by the time it is used for UL grant. In other words, allowing flexibility in sounding bandwidth can result in longer CQI acquisition times, which in turn can result in sounding opportunities that spread over multiple coherence intervals.

Figure 11:
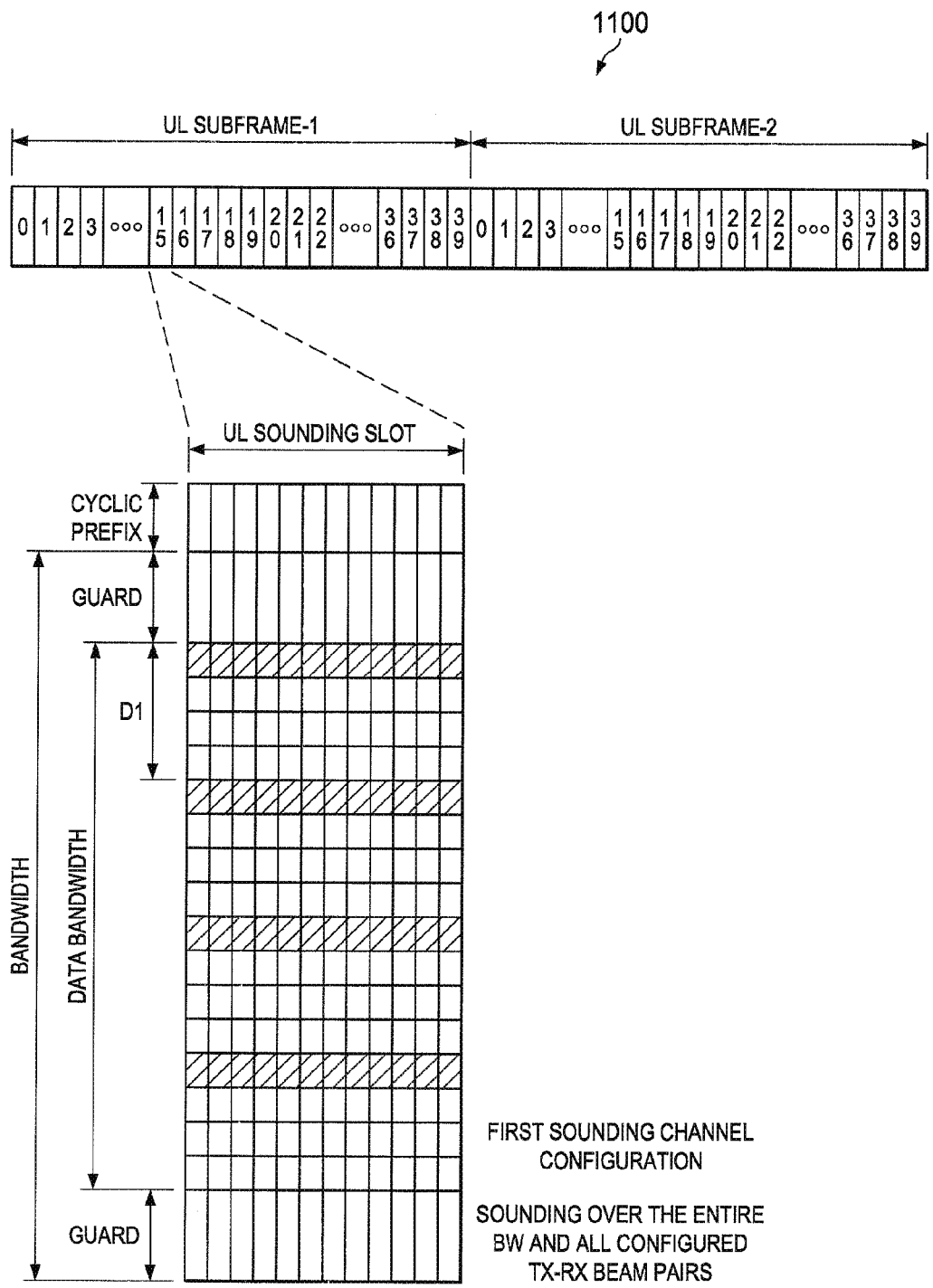
FIG. 11 illustrates an example diagram of a first sounding channel configuration where pilots are placed using a decimation separation according to this disclosure.

A UL sounding channel can be configured and operated to enable fast and efficient operation and to derive channel CQI over different bandwidth granularities within the coherence time. In some embodiments, the BS can configure at least one sounding channel having at least one OFDM symbol to carry UL-SRSs corresponding to at least one transmit beam, where the UL-SRSs are placed in a way that allows channel estimation at the BS over an entire usable bandwidth. The MS can transmit UL-SRSs configured by the BS. For example, the BS can configure a first sounding channel to be an uplink sounding slot in the uplink sub-frame. A slot can contain multiple OFDM symbols, all of which carry UL-SRSs in order to enable scanning using different transmit-receive beam pairs. In an OFDM symbol of the slot, the UL-SRS corresponding to a transmit-receive beam pair can be placed in different sub-carriers in a way that allows channel estimation over the entire data bandwidth. When configuring an MS, a BS can transmit to the MS a UL sounding configuration message that sets the sounding sub-band bitmap to a maximum specifiable value to indicate UL-SRS placement over the entire data bandwidth. FIG. 11 illustrates an example diagram of a first sounding channel configuration 1100 where pilots are placed using a decimation separation according to this disclosure.

In some embodiments, the BS can configure a second sounding channel whose configuration may be dependent on the configuration of the first sounding channel. The dependence of the second sounding channel on the configuration of the first sounding channel will be disclosed further below. Accordingly, the MS can identify or know if a configuration of the sounding channel belongs to a first sounding channel configuration.

In some embodiments, an MS can identify if a configuration of a sounding channel belongs to the first sounding channel configuration because the indication of the first sounding channel configuration is implicitly indicated. The MS can use the sounding sub-band bitmap field to identify if a sounding channel configuration is a first sounding channel. If a received UL Sounding Configuration message at the MS has the sounding sub-band bitmap field set to the maximum value, the MS can use the setting to identify that a first sounding channel configuration has been configured for it. The UL-SRS corresponding to the $N_b^{MS,s1}$ number of configured transmit beams can be transmitted with $N_{SRS}^{REP}$ repetitions in the configured UL sounding slot.

In some embodiments, an MS can identify if a configuration of a sounding channel belongs to the first sounding channel configuration because the configuration of the first sounding channel index is explicitly indicated in the MS specific UL sounding channel message. The MS specific UL sounding channel message can explicitly indicate that configuration of a sounding channel belongs to the first sounding channel configuration by using a field called the sounding channel index. For the first sounding channel, the sounding channel index field can be set to 00. Each subsequent sounding channel configuration transmitted to the MS can have a different value for the sounding channel index.

If the sounding channel configuration field is set to 00 and the FDD mode=1, the configuration message may not contain any sounding sub-band bitmap field since the first sounding channel can be configured to sound over the entire bandwidth. The indication of FDD mode can typically be carried in a broadcast message like the superframe header from the BS to all MS. However, the sounding sub-band bitmap field can be carried for sounding channel indices that are not set to 00.

Figure 12:
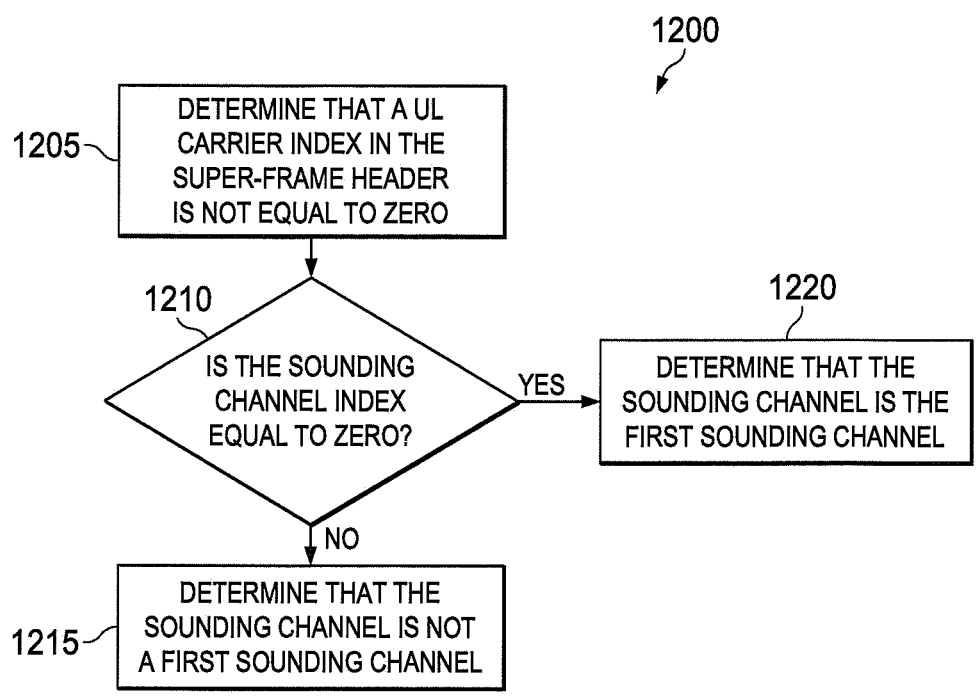
FIG. 12 is an example flow logic diagram for interpreting an uplink (UL) sounding channel configuration message based on a value in a sounding channel index field according to this disclosure.

FIG. 12 is an example flow logic diagram 1200 for interpreting a UL sounding channel configuration message based on a value in a sounding channel index field and the determination of FDD mode according to this disclosure. For example at step 1205, an MS can determine that a UL carrier index in the super-frame header is not equal to zero. If the UL carrier index is not equal to zero, then, at step 1210, the MS can determine if the sounding channel index is equal to zero. If the sounding channel index is not equal to zero, then at step 1215, the MS can determine that the sounding channel is not a first sounding channel. A sounding sub-band bitmap field in a sounding channel configuration message can direct the MS to transmit UL-SRS over the bandwidth specified in the sub-band bitmap. If the sounding channel index is equal to zero, then at step 1220, the MS can determine that the sounding channel is the first sounding channel. The MS can transmit UL-SRS over the entire bandwidth.

In some embodiments, the BS can configure a second sounding channel to an MS for transmitting UL-SRS corresponding to at least one transmit beam on a specified portion of the bandwidth. The second sounding channel can be configured by the BS to an MS with parameters different from the first sounding channel.

Figure 13:
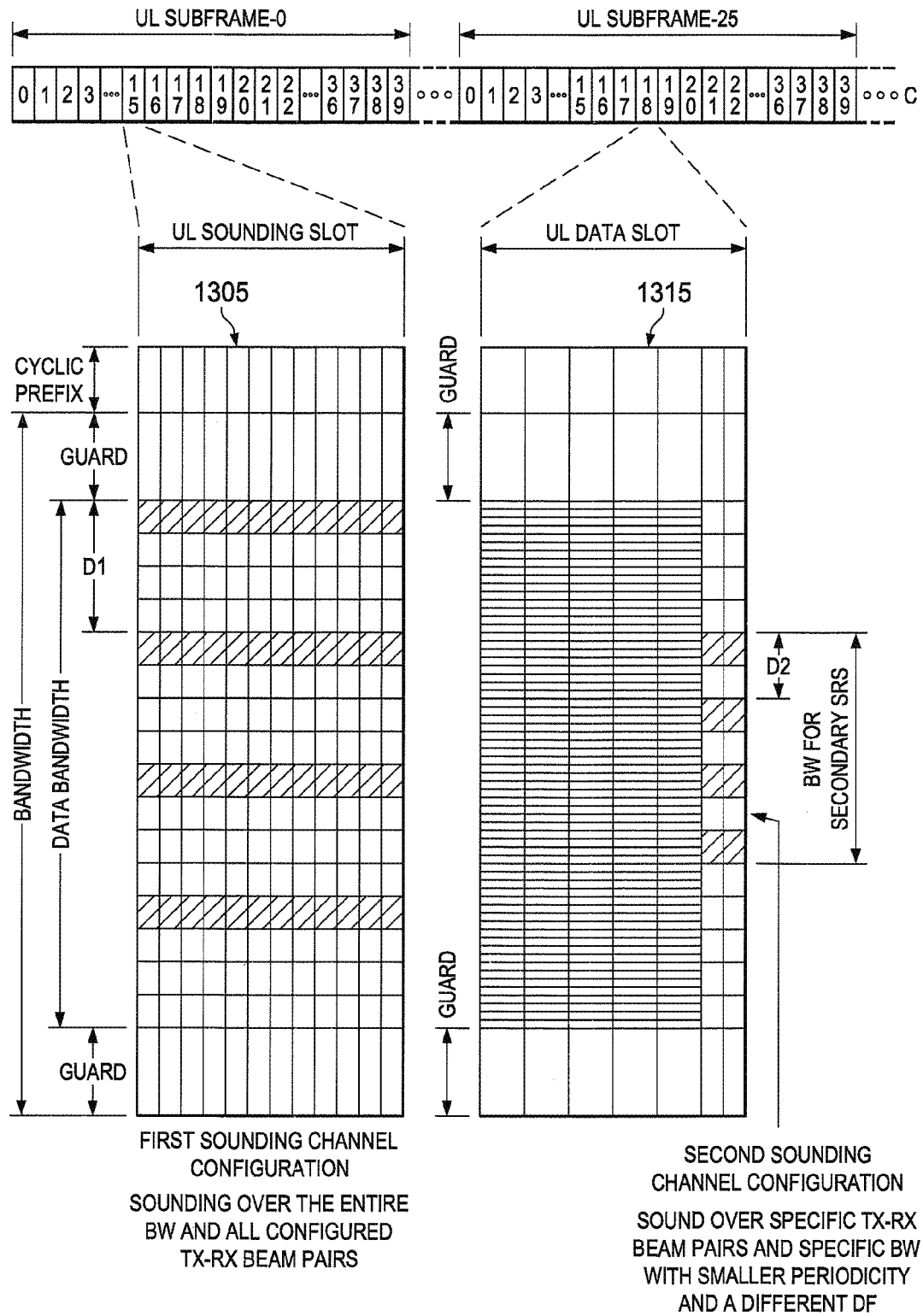
FIG. 13 illustrates an example diagram of a first sounding channel for beam scanning and a second sounding channel for channel measurement refinement according to this disclosure.
Figure 13:
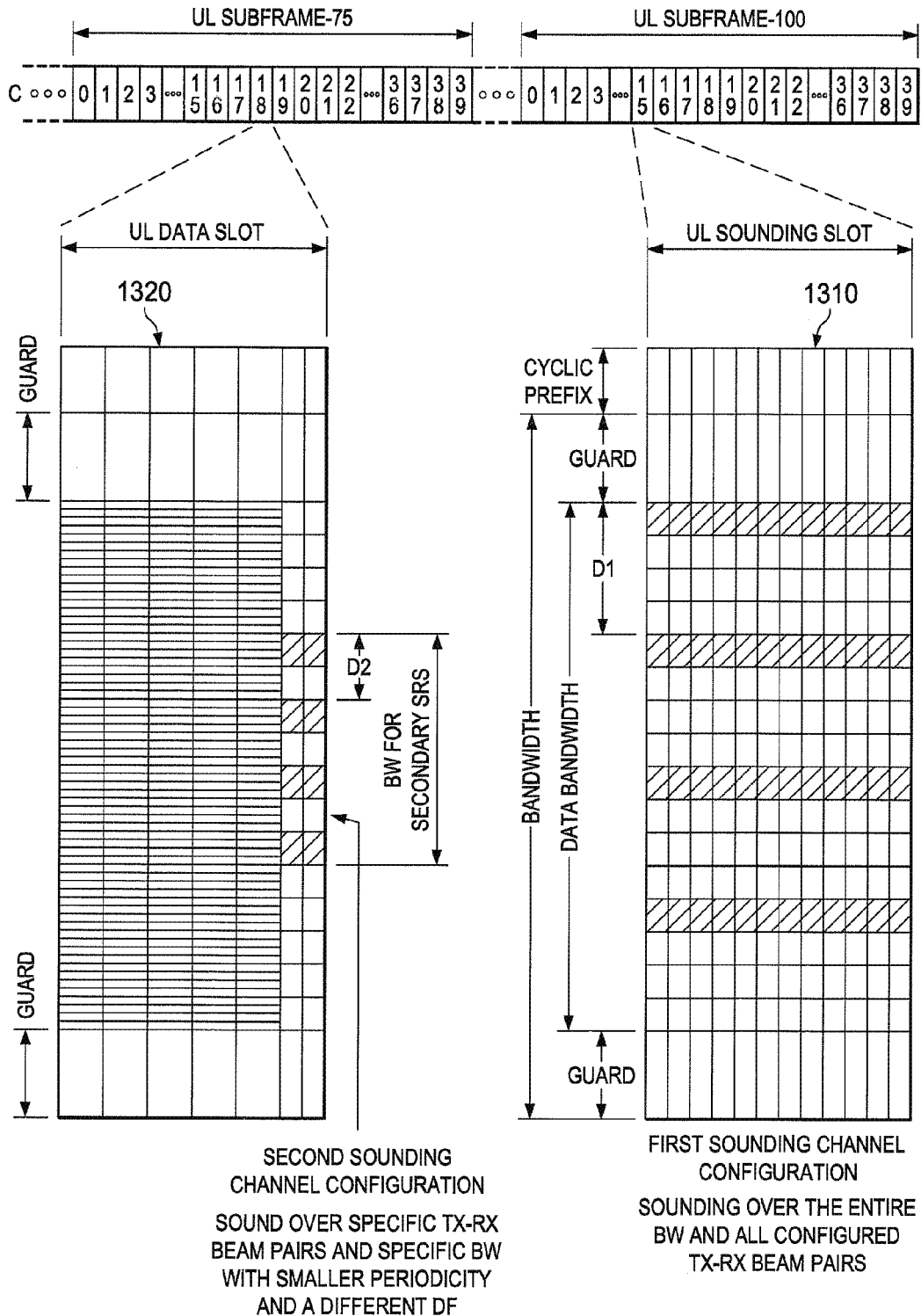

FIG. 13 illustrates an example diagram of a first sounding channel 1305, 1310 for beam scanning and a second sounding channel 1315, 1320 for channel measurement refinement according to this disclosure. As illustrated in FIG. 13, the first sounding channels 1305 and 1310, as well as the second sounding channels 1315 and 1320, can be configured on a sounding slot and a shared data slot, respectively. The first sounding channel 1305, 1310 scheduled in a sounding slot with a decimation index $D_1$ can enable a scanning of multiple transmit-receive beam pairs. The UL-SRSs can be placed according to the decimation index $D_1$ across the entire bandwidth to enable acquisition of both wide-band and sub-band CQI. The measurements from the first sounding channel 1305, 1310 can be used in determining the sounding bandwidth, as well as the beam-pairs on which the UL-SRS is to be transmitted in the second sounding channel 1315, 1320. Furthermore, as illustrated in FIG. 13, the second sounding channel 1315, 1320 can be configured on a pre-configured SRS channel in a UL data slot, which can enable CQI and other measurements using SRS with a decimation index $D_2$ over a bandwidth that is also configurable.

Figure 14:
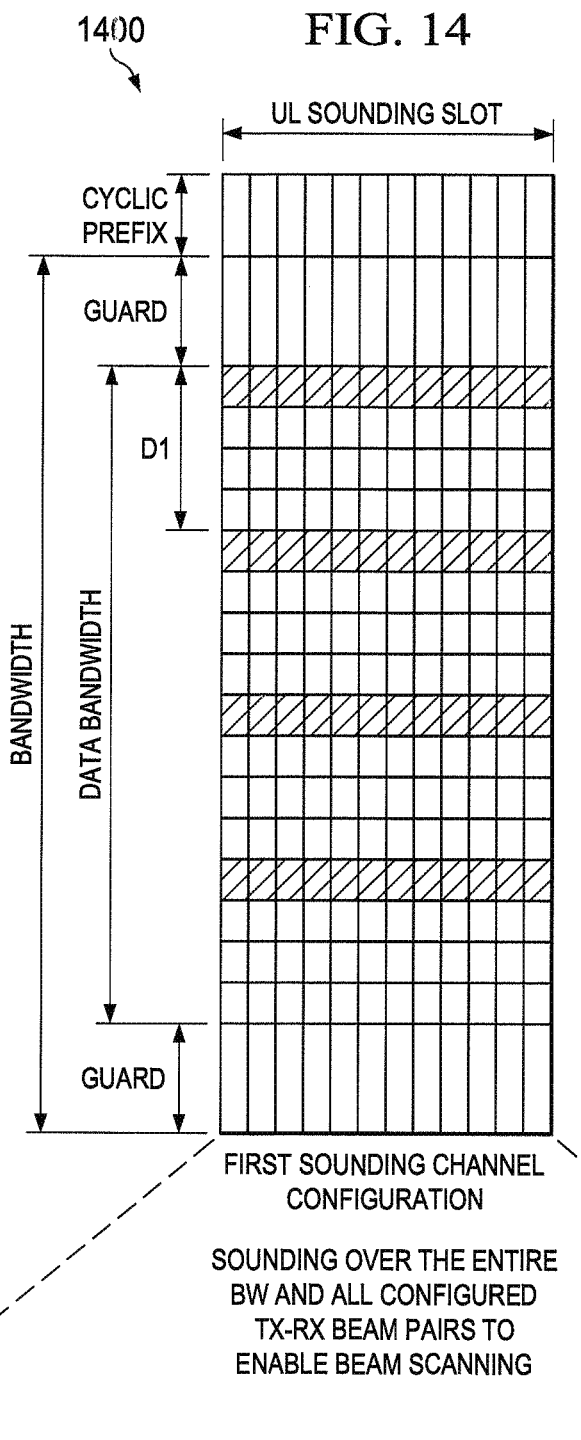
FIG. 14 illustrates an example diagram of beam scanning over multiple transmit-receive beam pairs in a first OFDM symbol according to this disclosure.
Figure 14:
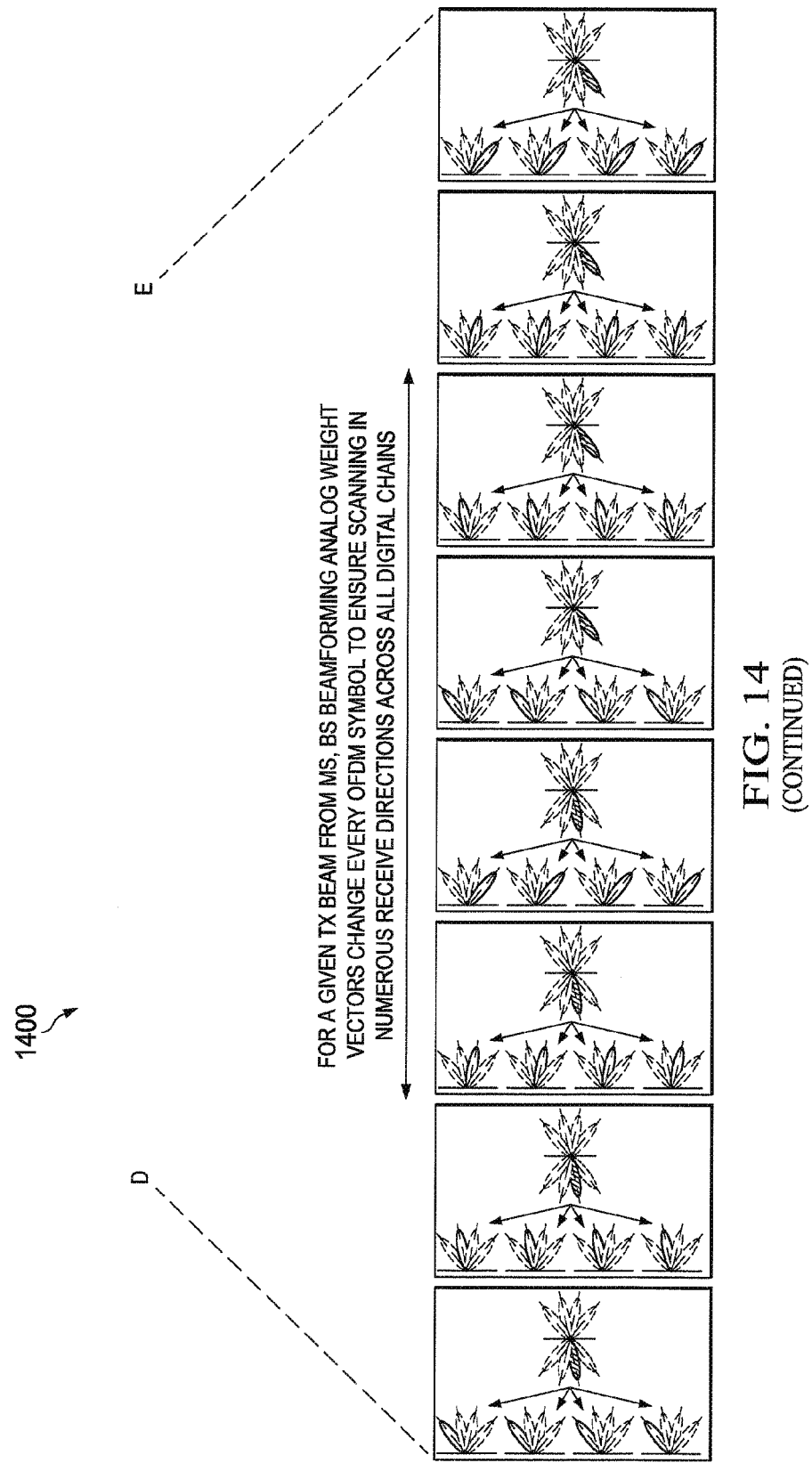

FIG. 14 illustrates an example diagram of beam 1400 scanning over multiple transmit-receive beam pairs in a first OFDM symbol according to this disclosure. The interpretation of the fields in the second sounding channel for configuring the second UL-SRS transmission can be derived from the configuration of the first sounding channel. For example, the second sounding channel can be configured for an MS to transmit UL-SRS corresponding to $N_b^{MS,s2}$ number of transmit beams. The configured number of beams for UL-SRS transmission in the second sounding channel $N_b^{MS,s2}$ can be less than or equal to the number of transmit beams configured for the first sounding channel ($N_b^{MS,s1}$). If the number of transmit beams configured in the second sounding channel is less than the number of beams configured in the first sounding channel, the MS can transmit UL-SRS corresponding to the first $N_b^{MS,s2}$ of the $N_b^{MS,s1}$ transmit beams in the configured second sounding channel. If the first sounding channel configures the MS to transmit UL-SRS corresponding to $N_b^{MS,s}=2$, the MS can select and transmit the UL-SRS corresponding to the two transmit beams. With a repetition factor per beam $N_{SRS}^{REP}=4$, the MS can transmit UL-SRS over eight symbols in total in the UL sounding slot, which can allow the scanning of eight different beam pairs per digital chain pair as illustrated in FIG. 14.

Figure 15:
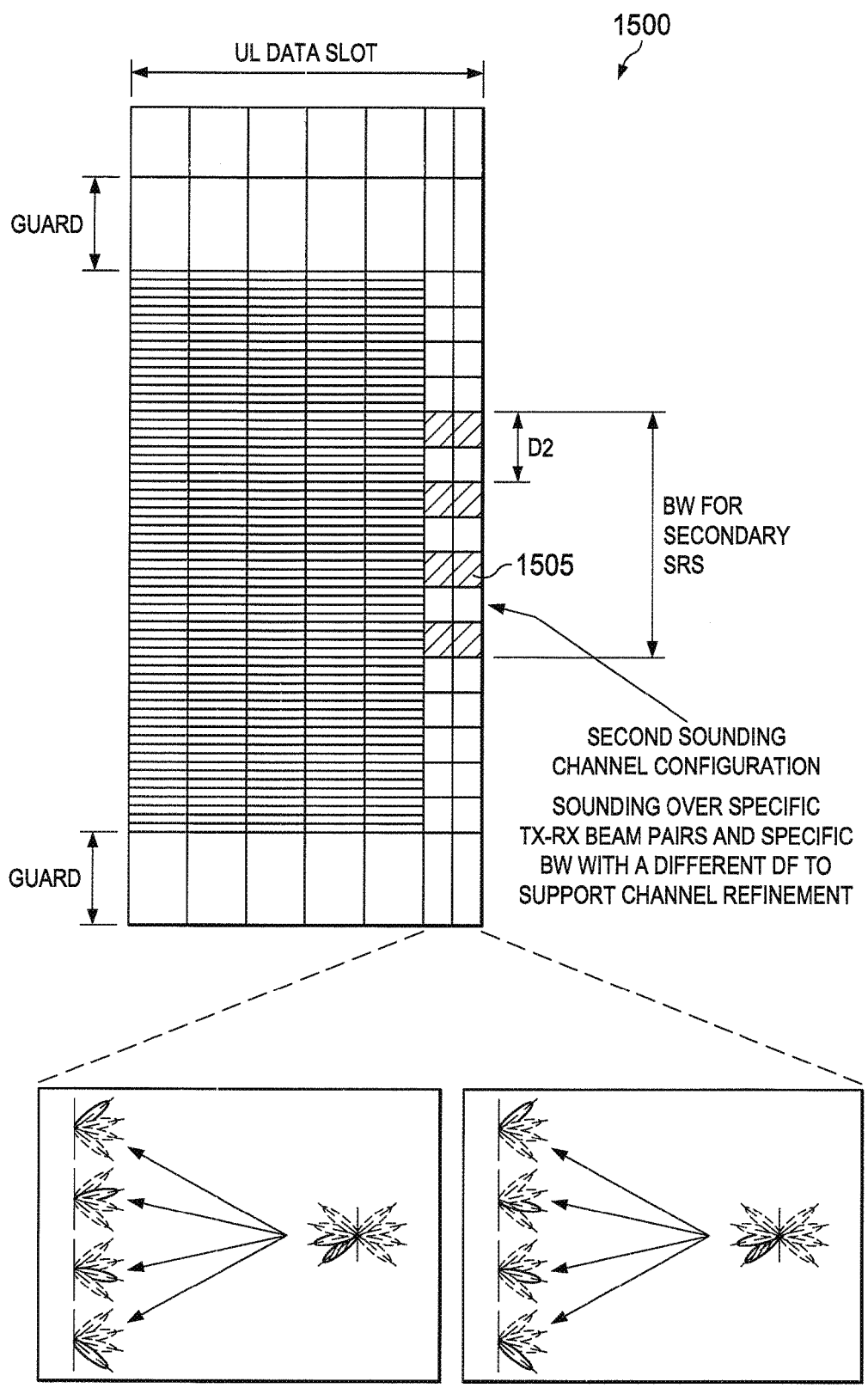
FIG. 15 illustrates an example diagram of specific beam pair scanning in a second sounding slot according to this disclosure.

If a second sounding channel is configured for the MS after the configuration of the first sounding channel with parameters $N_b^{MS,s2}=2$ and a repetition factor per beam $N_{SRS}^{REP}=1$, the MS can transmit UL-SRS using the same two transmit beams that were used for SRS transmission in the first sounding channel. In some embodiments, the two beams can be transmitted over two OFDM symbols that make up the second sounding channel's physical resources based on the parameters configured for the second sounding channel as illustrated in FIG. 15. FIG. 15 illustrates an example diagram 1500 of specific beam pair scanning in a second sounding slot according to this disclosure.

A second sounding channel can be explicitly indicated using a sounding channel index field in the MS-specific sounding channel configuration message such that sounding channel index field is set to 01. An MS can identify the second sounding channel configuration 1505 using the sounding sub-band bitmap field (indicating the bandwidth) and the number of beams configured for the second sounding channel. In this case where there is no explicit indication, the MS can use the configuration parameters like the number of beams ($N_b^{MS,s1}$) and the number of repetitions ($N_{SRS}^{REP}$) of the previously-configured sounding channel, where the sounding sub-band bitmap field is set to the maximum value in order to interpret the configuration in the current sounding channel. The fields in the second sounding channel allocation that depend on previously configured sounding channel can include the number of beams to be transmitted, the number of repetitions, and the like.

Figure 16:
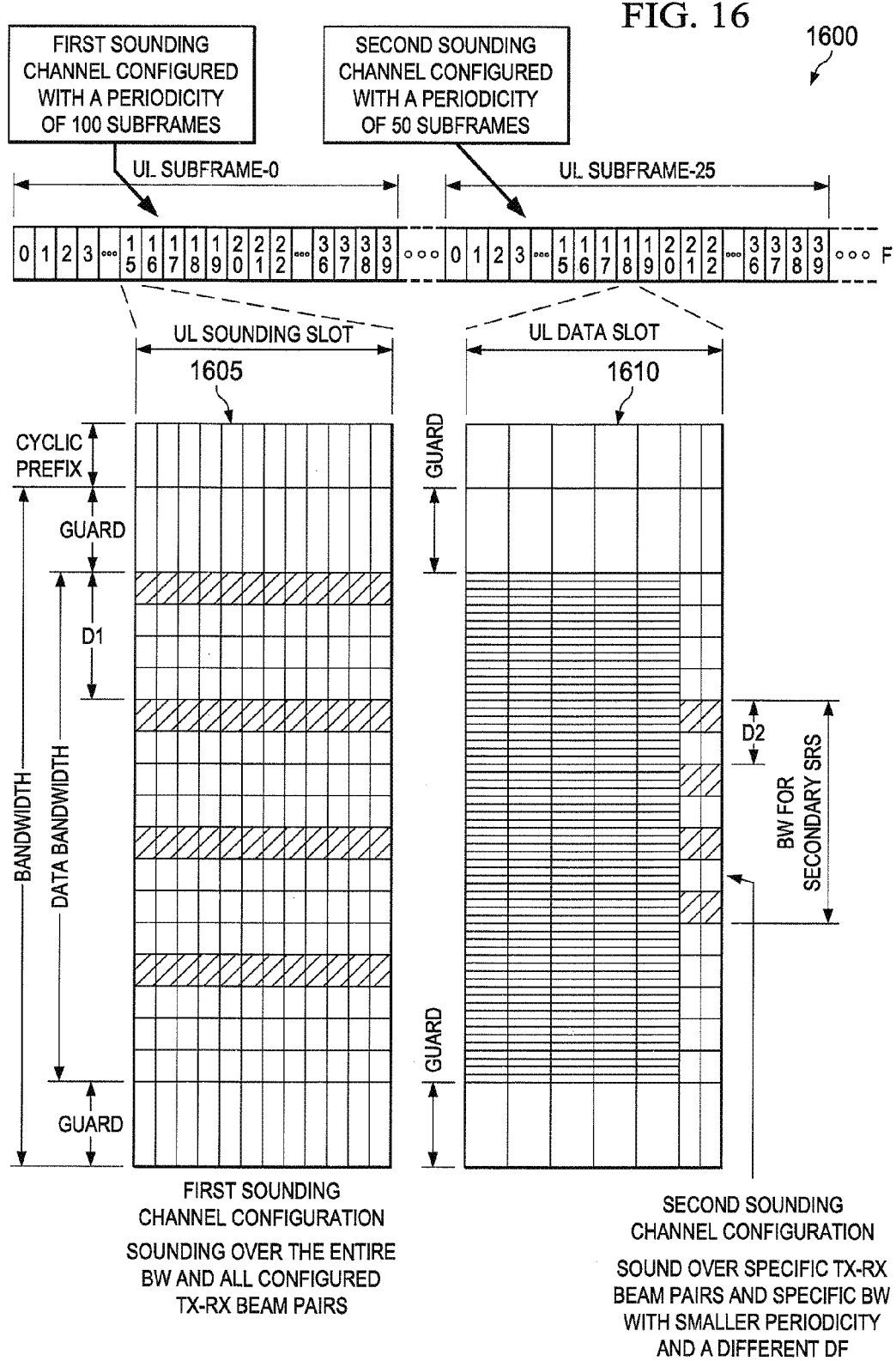
FIG. 16 illustrates an example diagram of a second sounding channel allocation, transmission, and expiration between two UL-SRS transmissions according to a first sounding channel periodicity according to this disclosure.

The parameters in the second sounding channel configuration message can be interpreted based on the first sounding channel configuration message as long as the configuration of the first sounding channel is still valid or an explicit sounding channel index is transmitted. When a second sounding channel is configured after a first sounding channel, the second sounding channel allocation can be set to be valid only until the next instance of the UL-SRS transmission according to the parameters set in the first sounding channel when the first sounding channel is configured with some periodicity. For example, if the first sounding channel is configured with a periodicity of once every 100 sub-frames, a second sounding channel allocation can be configured to have a periodicity of 50 sub-frames, beginning in the 25th sub-frame after the transmission of the SRS corresponding to the first sounding channel and expiring after 2 transmissions. The fourth transmission can revert back to the transmission of UL-SRS configured by the first sounding channel allocation as illustrated in FIG. 16. FIG. 16 illustrates an example diagram of a second sounding channel allocation, transmission, and expiration between two UL-SRS transmissions according to a first sounding channel periodicity according to this disclosure. Furthermore, as illustrated in FIG. 16, an in-built expiration can save resources by not requiring the BS to transmit another message to the MS indicating an expiration of the configured sounding channel. Such a configuration can also allow application of the second sounding channel (such as second sounding channels 1610 and 1615) to targeted sub-bands that provide maximum gains based on short term fading and based on the most recent estimates from the first sounding channel (such as first sounding channels 1605 and 1620.

The decimation index $D_2$ used in the second sounding channel configuration (1610 and/or 1615) can be smaller than the decimation index $D_1$ of the first sounding channel (1605 and/or 1620). By making the decimation index smaller, the number of pilots can be increased for a fixed bandwidth. This can allow more granularity or refinement in the estimated channel quality over promising sub-bands with the second sounding channel to maximize short term fading returns compared to the estimate CQI with the first sounding channel. In other words, the second sounding channel can be used to refine the CQI estimates from the first sounding channel. It should be understood that an increased pilot density for a given bandwidth can be performed even if the sounding allocation uses a cyclic shift separation (CSS). With a CSS, the length of cyclic shift code can be shorter in the second sounding channel to improve channel refinement.

The second sounding channel can be configured as an aperiodic, one-shot focused sounding opportunity in response to a bandwidth request message from the MS. Each sub-band indicated in the sub-band bitmap field of the second sounding channel configuration can be linked to its own set of parameters similar to the number of beams for which UL-SRS is to be transmitted, the number of repetitions per beam, and the decimation or CSS code length to be used in the sub-band.

A sounding channel assignment can include a primary sounding channel configured to transmit UL-SRS over the entire bandwidth and allow scanning over multiple beam-pairs. The primary sounding channel can be the same as the first sounding channel identified by the sounding channel index 00. In addition to the primary sounding channel, the BS can also configure secondary, tertiary, and other ancillary sounding channels for SRS transmission. The configured parameters in the secondary and other sounding channel channels can be interpreted and derived from the transmission parameters used in the primary sounding channel. Other than primary sounding channels, uplink sounding channels can be designed to be assigned with no restrictions on the bandwidth resource for the transmission of RS symbols and can allow scanning over a subset of beam-pairs scanned in the primary sounding channel.

The BS can configure secondary, tertiary, and other ancillary sounding channels to specify the different parameters corresponding to the different sub-bands. An assignment for the ancillary sounding channels can address at least one sub-band for which UL-SRS transmission parameters, such as the number of beams for which UL-SRS is to be transmitted, the number of repetitions per beam, and the decimation or CSS code length to be used in the sub-bands transmitted to the MS. Sub-bands that are configured to have the same set of parameters can be transmitted as a single configuration message in which the sub-bands chosen are indexed by a sub-band bitmap field. Different sets of configurations for different sub-bands can be transmitted in separate configuration messages as secondary, tertiary, quaternary, and other ancillary sounding channels. All of these non-primary sounding channels can interpret their parameters based on the configured parameters in the primary sounding channel.

The secondary sounding channel can use the parameters of the primary sounding channel to interpret its configuration. Additionally, the tertiary sounding channel can use the secondary sounding channel parameters to interpret its configuration. The primary, secondary, and tertiary sounding channels can be identified by a sounding channel index transmitted in their respective sounding channel configuration messages. The primary channel can use a sounding channel index=00, the secondary channel can use a sounding channel index=01, the tertiary channel can use a sounding channel index=10, and so on. A sounding channel with sounding channel index N, where N is the decimal equivalent of the binary string indicated in the message, can use the parameters of the sounding channel with index N−1 to interpret its configured parameters. For example, if the number of transmit beams configured in the $N^{th}$ sounding channel is less than the number of beams configured in the $N-1^{th}$ sounding channel, the MS can transmit UL-SRSs corresponding to the first $N_b^{MS,s_n}$ of the $N_b^{MS,s_{n-1}}$ transmit beams in the configured $N^{th}$ sounding channel. This hierarchical sounding channel arrangement can allow a configuration where every new sounding channel configured for an MS is designed to improve the resolution and accuracy of the channel quality estimate over existing or previous sounding channel allocations over an indexed fraction of the bandwidth.

The primary sounding channel and other ancillary sounding channels can be configured based on MS capabilities. For example, if the MS has multiple digital chains, the sounding channels can be configured to specifically indicate a configuration per digital chain.

The secondary sounding channel and other ancillary sounding channels can be specific about the digital chain that the MS uses for transmission and can indicate the number of beams on which SRS is to be sent as well as repetitions per digital chain. The MS beamforming capability can be leveraged to provide a refined channel estimate with every additional sounding channel configured. For example, the beamwidths of the beams that the MS uses can shrink with every additional sounding channel to provide a refinement of the channel estimate. The beams with smaller beamwidths for the $N^{th}$ sounding channel can span a sub-set of directions identified by beams in the $N^{th}$ sounding channel or the primary sounding channel. The BS can indicate the beamwidth reduction process when transmitting the configuration message for the sounding channels. If no explicit signaling is allowed, the MS can use the capability exchange during the initial network entry to indicate to the BS that such refinement is possible so that the BS knows to expect beam refinement with every additional sounding channel configuration for the MS.

An MS's capability to estimate an angle of arrival, an angle of departure, and other channel parameters can be transmitted to the BS, which uses the MS's capability to estimate in order to determine the sounding channel configuration. This channel estimation capability can be transmitted by the MS to the BS as part of a capability exchange transaction during initial network entry or in response to a request from the BS. The processing capability of the MS can be used by the BS or a network entity to determine periodicity of the sounding channel. The processing capability of the MS can be indicated to the BS as part of capability exchange during initial network entry or as a standalone message when requested by the BS.

The BS can use Doppler estimates to determine configuration of secondary sounding channels, tertiary sounding channels, and other ancillary sounding channels after it has configured the first sounding channel. For example, the BS can derive the Doppler estimate from reference symbols or get it as feedback from the MS. The BS can schedule a second sounding channel or other ancillary sounding channel based on estimated interference of the signal from the MS. The BS can schedule secondary sounding channels or other ancillary sounding channels if the BS observes differences (such as beyond a threshold) in the estimated SINR between at least two successive SRS transmissions. The successive SRS transmissions can be from a sounding channel configured to transmit periodically. A BS can also schedule secondary sounding channels or other ancillary sounding channels if the BS observers differences (such as beyond a threshold) in the estimated SINR between at least two successive SRS transmissions even if they are transmissions belong to different configurations.

Figure 17:
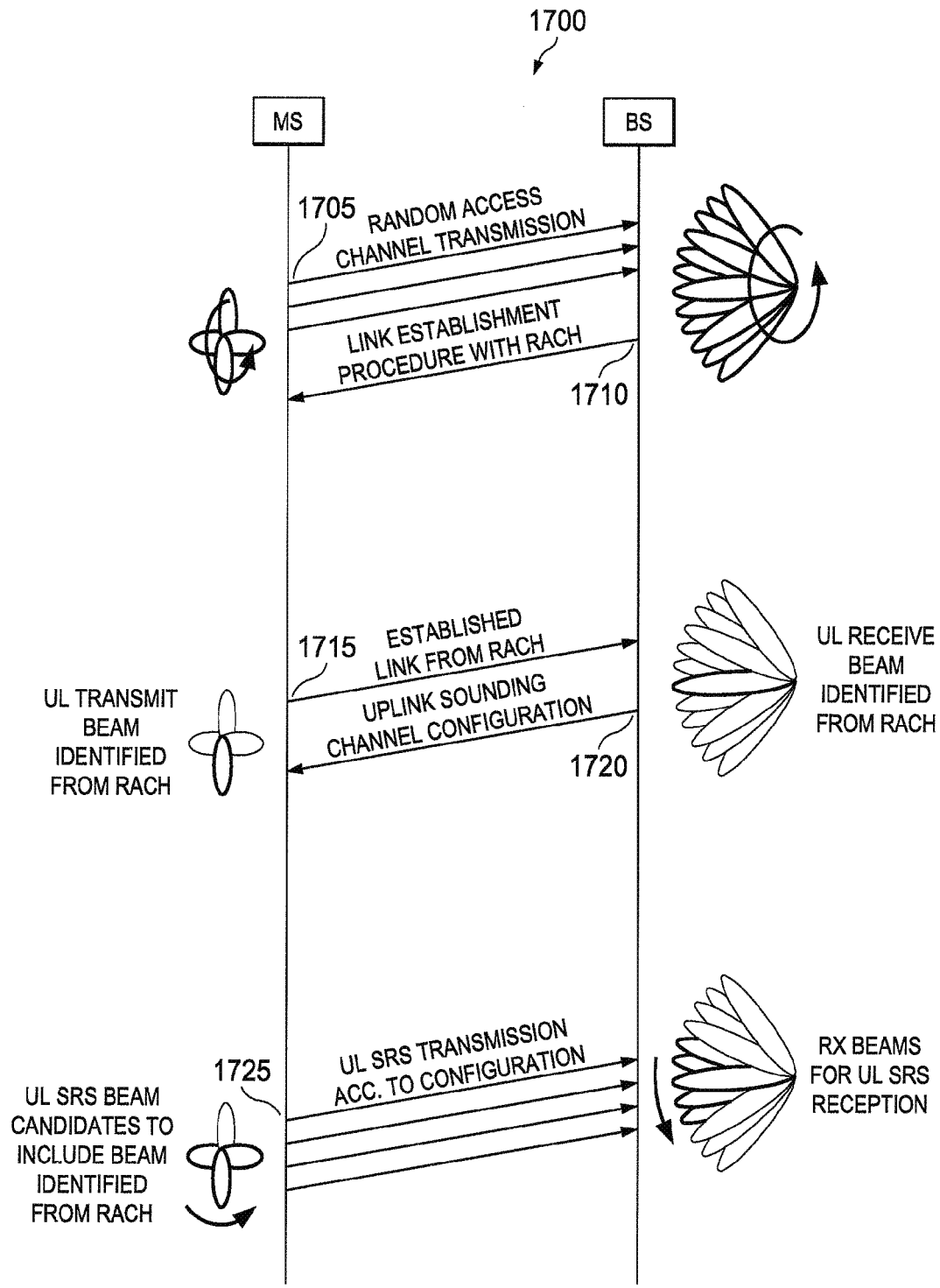
FIG. 17 illustrates an example operation of UL sounding when a Random Access channel (RACH) for initial network entry (or network re-entry) is considered instead of a primary sounding channel according to this disclosure.

A Random Access channel (RACH) procedure can be used to select or shortlist the set of beams chosen for the UL-SRS transmission at the MS. FIG. 17 illustrates an example operation 1700 of UL sounding when a RACH for initial network entry (or network re-entry) is considered instead of a primary sounding channel according to this disclosure. At step 1705, link establishment during initial network entry, RACH can provide the MS with the transmit (TX) beam index or indices capable of reaching the BS and can give the BS a sense of the link quality to the MS. At step 1710, a link is established between the BS and the MS using the RACH procedure. This link establishment procedure using RACH can be used instead of a primary sounding channel because, during initial network entry and network re-entry, the MS may try different TX beams until a RACH code sent on a particular TX beam receives a response from the BS. Once the response is received from the BS, further exchange of information on the selected TX beam at the MS and receive (RX) beam at the BS can occur at step 1715. The uplink sounding channel configuration, at step 1720, is transmitted to the MS on a TX beam identified in the initial RACH. Therefore, at step 1725, using a UL-SRS transmission is configured for the MS, the selected transmit beams for UL-SRS transmission can include the transmit beam identified by the RACH procedure. While the TX beam index chosen at the MS may not be known to the BS, the BS can identify the receive beam that it should use to receive data from the MS. The configuration can include an indicator for the receive beam sweeping so that the selected transmit beams are received on a set of receive beams at the BS that include the ones identified in the RACH procedure with the MS.

Figure 18:
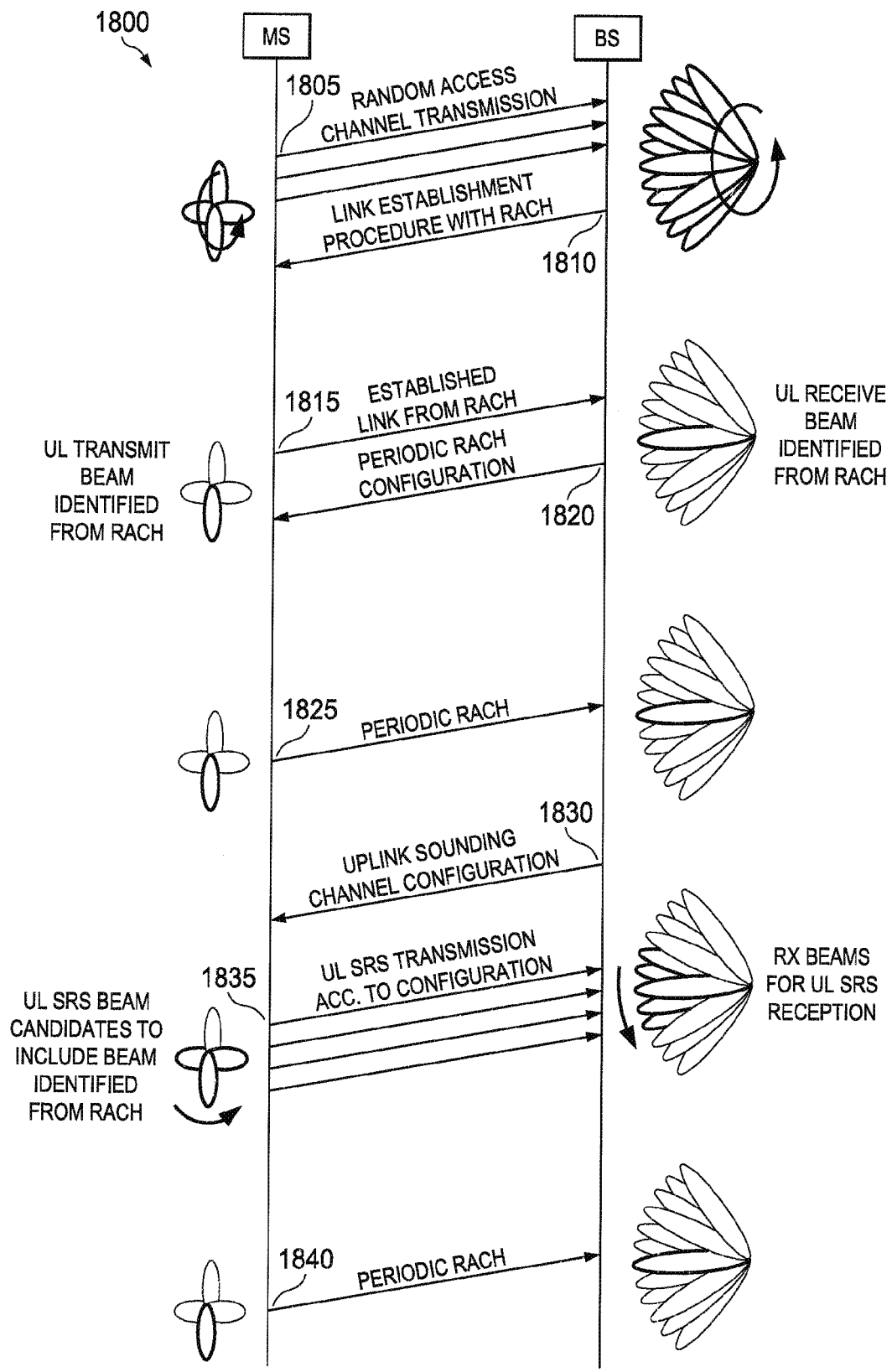
FIG. 18 illustrates an example operation of UL sounding when periodic RACH is considered instead of a primary sounding channel according to this disclosure.

FIG. 18 illustrates an example operation 1800 of UL sounding when periodic RACH is considered instead of a primary sounding channel according to this disclosure. For example, at step 1805, link establishment during initial network entry using RACH can provide the MS with the transmit (TX) beam index or indices capable of reaching the BS and can give the BS a sense of the link quality to the MS. At step 1810, a link is established between the BS and the MS using the RACH procedure. This link establishment procedure using RACH can be used instead of a primary sounding channel because, during initial network entry and network re-entry, the MS may try different TX beams until a RACH code sent on a particular TX beam receives a response from the BS. Once the response is received from the BS, further exchange of information on the selected TX beam at the MS and receive (RX) beam at the BS can occur until a link is established at step 1815. At step 1820, the BS can send periodic RACH configuration to the MS to enable link maintenance. During periodic RACH, depending on its configuration, at step 1825, the MS can transmit RACH on a TX beam identified in the initial RACH or transmit RACH codes on a subset of TX beams to test other beam pair combinations for channel quality. Therefore, at step 1830, when a UL-SRS transmission is configured for the MS, the selected transmit beams for UL-SRS transmission can include the transmit beam identified by the RACH and periodic RACH procedure. The selected transmit beam for UL-SRS can include the transmit beam identified during a RACH procedure and transmitted at a time when the RX beam sweep of the BS includes the receive beams identified by the BS during the RACH procedure. At step 1835, the MS can transmit UL-SRS in the identified configuration to the BS. At step 1840, the MS can again transmit a periodic RACH on a TX beam identified in the initial RACH or transmit RACH codes on a subset of TX beams to test other beam pair combinations for channel quality.

Figure 19:
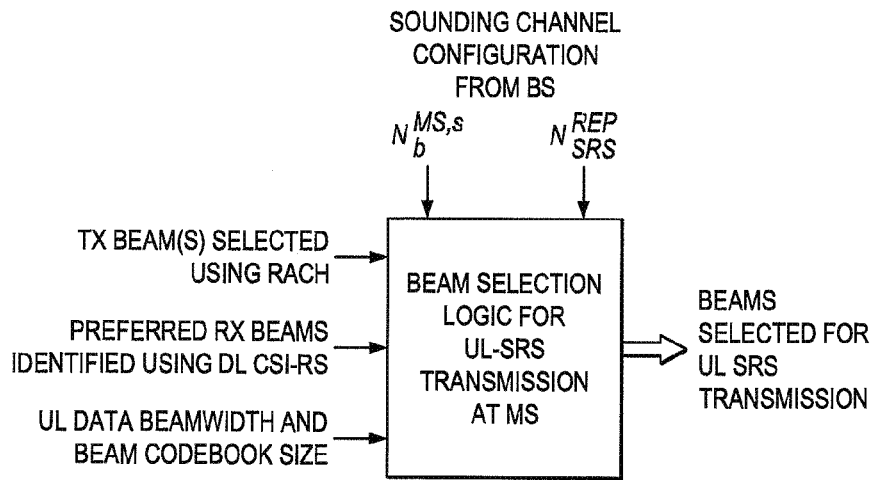
FIG. 19 illustrates an example of selection logic for choosing transmit (TX) beams to be used in UL-SRS transmission according to this disclosure.

FIG. 19 illustrates an example of selection logic for choosing TX beams to be used in UL-SRS transmission according to this disclosure. The MS can use the transmit beam identified using the initial RACH transmission, the received uplink SRS configuration from the BS, and the relationship between the RACH and data beam widths to identify the set of transmit beams for UL-SRS transmission. The identified transmit beams can be transmitted using the resources configured by the BS. If the wireless network is configured for a TDD operation, using reciprocity, the receive beams identified during downlink CSI-RS transmission can be used to determine the set of transmit beams for UL-SRS transmissions.

Figure 20:
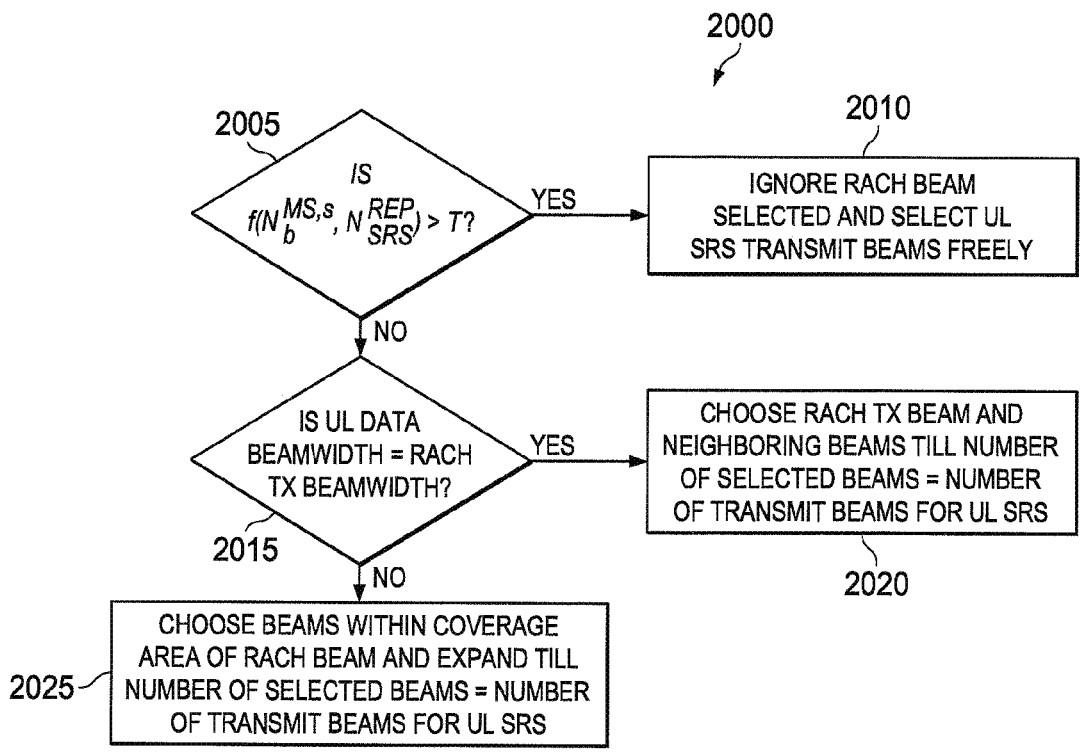
FIG. 20 is an example flowchart illustrating the use of beam selection logic for UL-SRS transmission according to this disclosure.
Figure 21:
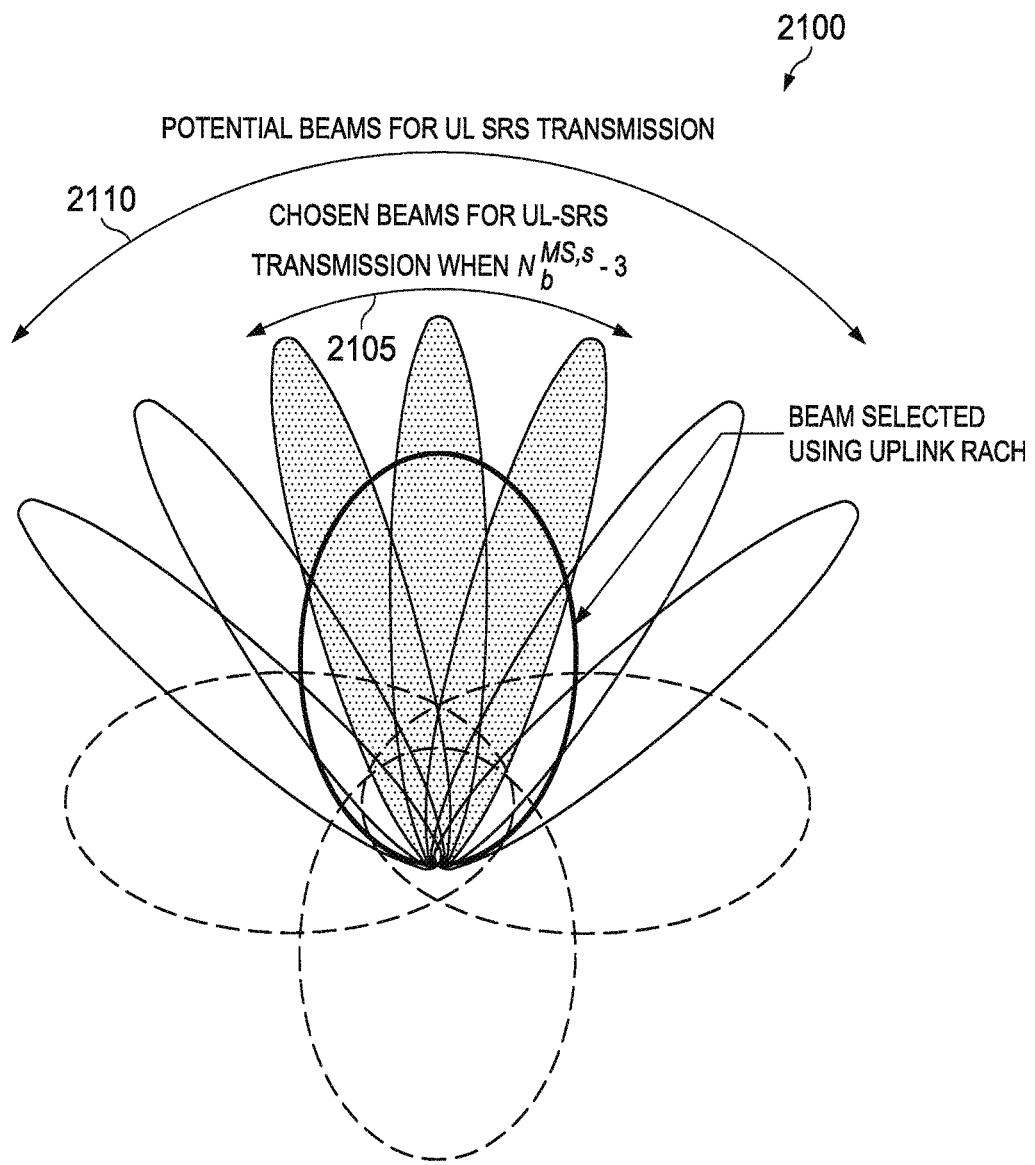
FIG. 21 is an example illustration of beams using UL-SRS and RACH with different beam widths according to this disclosure.

FIG. 20 is an example flowchart 2000 illustrating the use of beam selection logic for UL-SRS transmission according to this disclosure. The logic can use a function to map the received sounding channel configuration from the BS. In particular, the number of beams on which the UL-SRS is to be transmitted ($N_b^{MS,s}$) and the number of repetitions per beam ($N_{SRS}^{REP}$) received in the UL sounding configuration message can be used to determine how the transmit beams for the UL-SRS channel are selected. For example, at step 2005, if the received ($N_b^{MS,s}$, $N_{SRS}^{REP}$) are mapped to value greater than T (where T is a pre-configured parameter), then at step 2010, the transmit beams for UL-SRS can be chosen freely and may not include the RACH transmit beam. If, however, the received ($N_b^{MS,s}$, $N_{SRS}^{REP}$) combination is less than T, then the MS can include the direction of the RACH beams in the set of directions for which the UL-SRS is to be transmitted. Another level of logic selection could be based on the beam widths used in the transmission of UL-SRS and RACH. The transmit beams for UL-SRS could have smaller beam widths than those used for RACH since UL-SRS can be used to train for uplink data transmission. At step 2015, if the UL-SRS and RACH use beams with the same beam width, then at step 2020, the $N_b^{MS,s}$ beams can involve the RACH beam and its neighborhood of beams. If the UL-SRS and RACH use beams with the different beam width, then at step 2025, beams are chosen within the coverage area of RACH beams and expanded until the number of selected beams equals the number of transmit beams for UL-SRS. FIG. 21 is an example illustration of beams using UL-SRS and RACH with different beam widths according to this disclosure. As illustrated in FIG. 21, if the UL-SRS and RACH use beams 2100 with different beam widths 2105 and 2110, the chosen beams for UL-SRS transmission can involve the beam in the same direction as the RACH beam and several other beams in its neighborhood until all $N_b^{MS,s}$ beams can be selected.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. For use by a base station (BS) in a wireless network, a method comprising:
    configuring a first sounding channel to be an uplink sounding slot comprising at least one orthogonal frequency-division multiplexing (OFDM) symbol in an uplink sub-frame in order to carry one or more uplink sounding reference symbols (UL-SRSs) corresponding to at least one transmit beam of a first set of transmit beams in a first sounding channel set of sub-bands, the first sounding channel set of sub-bands comprising one or more sub-bands that cover a first data bandwidth;
    transmitting, to a mobile station (MS), a first UL sounding configuration message that sets a sounding sub-band bitmap value to a maximum specifiable value and indicates UL-SRS placement in the first sounding channel set of sub-bands;

receiving, through the first sounding channel set of sub-bands from the MS, the one or more UL-SRSs corresponding to at least the one transmit beam of the first set of transmit beams for channel estimation over the first data bandwidth;

configuring a second sounding channel to be a second uplink sounding slot comprising at least the one OFDM symbol in a second uplink sub-frame in order to carry one or more UL-SRSs corresponding to at least the one transmit beam of a second set of transmit beams in a second sounding channel set of sub-bands, the second sounding channel set of sub-bands comprising at least a subset of the first sounding channel set of sub-bands, the second set of transmit beams comprising at least a subset of the first set of transmit beams used in the first sounding channel;

transmitting, to the MS, a second UL sounding configuration message that sets a second sounding sub-band bitmap value to a value no greater than the maximum specifiable value and indicates UL-SRS placement in the second sounding channel set of sub-bands; and receiving, through the second sounding channel set of sub-bands from the MS, the one or more UL-SRSs corresponding to at least the one transmit beam of the second set of transmit beams for channel estimation over a second data bandwidth, wherein the second data bandwidth is at least a subset of the first data bandwidth.

2. The method of claim 1, wherein:
the first UL sounding configuration message comprises a sounding channel index value; and
the sounding channel index value provides an indication to the MS of the sounding sub-band bitmap value and the UL-SRS configuration in the first sounding channel set of sub-bands.

3. The method of claim 1, the method further comprising:
configuring a third sounding channel to be a third uplink sounding slot comprising at least the one OFDM symbol in a third uplink sub-frame in order to carry one or more UL-SRSs corresponding to at least one transmit beam of the third set of transmit beams in a third sounding channel set of sub-bands, the third sounding channel set of sub-bands comprising at least the subset of the first sounding channel set of sub-bands or at least a subset of the second sounding channel set of sub-bands, the third set of transmit beams comprising at least a subset of the first set of transmit beams or the second set of transmit beams;

transmitting, to the MS, a third UL sounding configuration message that sets a second sounding sub-band bitmap value to a value no greater than the maximum specifiable value and indicates UL-SRS placement in the third sounding channel set of sub-bands; and receiving, through the third sounding channel set of sub-bands from the MS, the one or more UL-SRSs corresponding to at least the one transmit beam of the third set of transmit beams for channel estimation over a third data bandwidth, wherein the third data bandwidth is at least a subset of one of the first data bandwidth or the second data bandwidth.

4. The method of claim 1, wherein a random access channel (RACH) is used by the BS to identify received beams for receiving sound reference symbols on the configured sounding channel.

5. A base station (BS) for use in a wireless network, the BS comprising:
at least one processing device configured to:
configure a first sounding channel to be an uplink sounding slot comprising at least one orthogonal frequency-division multiplexing (OFDM) symbol in an uplink sub-frame in order to carry one or more uplink sounding reference symbols (UL-SRSs) corresponding to at least one transmit beam of a first set of transmit beams in a first sounding channel set of sub-bands, the first sounding channel set of sub-bands comprising one or more sub-bands that cover a first data bandwidth;

initiate transmission, to a mobile station (MS), of a first UL sounding configuration message configured to set a sounding sub-band bitmap value to a maximum specifiable value and indicate UL-SRS placement in the first sounding channel set of sub-bands;

receive, through the first sounding channel set of sub-bands from the MS, the one or more UL-SRSs corresponding to at least the one transmit beam of the first set of transmit beams for channel estimation over the first data bandwidth;

configure a second sounding channel to be a second uplink sounding slot comprising at least the one OFDM symbol in a second uplink sub-frame in order to carry one or more UL-SRSs corresponding to at least one transmit beam of a second set of transmit beams in a second sounding channel set of sub-bands, the second sounding channel set of sub-bands comprising at least a subset of the first sounding channel set of sub-bands, the second set of transmit beams comprising at least a subset of the first set of transmit beams used in the first sounding channel;

initiate transmission, to the MS, of a second UL sounding configuration message that sets a second sounding sub-band bitmap value to a value no greater than the maximum specifiable value and indicates UL-SRS placement in the second sounding channel set of sub-bands; and receive, through the second sounding channel set of sub-bands from the MS, the one or more UL-SRSs corresponding to at least the one transmit beam of the second set of transmit beams for channel estimation over a second data bandwidth, wherein the second data bandwidth is at least a subset of the first data bandwidth.

6. The BS of claim 5, wherein:
the first UL sounding configuration message comprises a sounding channel index value; and
the sounding channel index value provides an indication to the MS of the sounding sub-band bitmap value and the UL-SRS configuration in the first sounding channel set of sub-bands.

7. The BS of claim 5, wherein the at least one processing device is further configured to:
configure a third sounding channel to be a third uplink sounding slot comprising at least the one OFDM symbol in a third uplink sub-frame in order to carry one or more UL-SRSs corresponding to at least one transmit beam of a third set of transmit beams in a third sounding channel set of sub-bands, the third sounding channel set of sub-bands comprising at least the subset of the first sounding channel set of sub-bands or at least a subset of the second sounding channel set of sub-bands, the third set of transmit beams comprising at least a subset of the first set of transmit beams or the second set of transmit beams;

transmit, to the MS, a third UL sounding configuration message that sets a second sounding sub-band bitmap value to a value no greater than the maximum specifiable value and indicates UL-SRS placement in the third sounding channel set of sub-bands; and receive, through the third sounding channel set of sub-bands from the MS, the one or more UL-SRSs corresponding to at least the one transmit of the third set of transmit beams for channel estimation over a third data bandwidth, wherein the third data band width is at least a subset of one of the first data bandwidth or the second data bandwidth.

8. The BS of claim 5, wherein a random access channel (RACH) is used by the BS to identify received beams for receiving sound reference symbols on the configured sounding channel.

9. For use by a mobile station (MS) in a wireless network, a method comprising:
receiving, from a base station (BS), a first uplink (UL) sounding configuration message that sets a sounding sub-band bitmap value to a maximum specifiable value and indicates uplink sounding reference symbol (UL-SRS) placement in a first sounding channel set of sub-bands associated with a first sounding channel, the first sounding channel set of sub-bands comprising one or more sub-bands that cover a first data bandwidth, the first sounding channel configured to be an uplink sounding slot comprising at least one orthogonal frequency-division multiplexing (OFDM) symbol in an uplink sub-frame in order to carry one or more UL-SRSs corresponding to at least one transmit beam of a first set of transmit beams in the first sounding channel set of sub-bands;
transmitting, through the first sounding channel set of sub-bands to the BS, the one or more UL-SRSs corresponding to at least the one transmit beam in the first set of transmit beams for channel estimation over the first data bandwidth;
receiving, from the BS, a second UL sounding configuration message that sets a second sounding sub-band bitmap value to a value no greater than the maximum specifiable value and indicates UL-SRS placement in a second sounding channel set of sub-bands associated with a second sounding channel, the second sounding channel set of sub-bands comprising at least the first sounding channel set of sub-bands, the second sounding channel configured to be a second uplink sounding slot comprising at least the one OFDM symbol in a second uplink sub-frame in order to carry one or more UL-SRSs corresponding to at least one transmit beam of a second set of transmit beams, the second set of transmit beam comprising at least a subset of the first set of transmit beams used in the first sounding channel; and
transmitting, through the second sounding channel set of sub-bands to the BS, the one or more UL-SRSs corresponding to at least the one transmit beam of the second set of transmit beams for channel estimation over a second data bandwidth, wherein the second data bandwidth is at least a subset of the first data bandwidth.

10. The method of claim 9, further comprising:
receiving a sounding channel index value, the sounding channel index value providing an indication of the sounding sub-band bitmap value and the UL-SRS configuration in the first sounding channel set of sub-bands.

11. The method of claim 9, further comprising:
receiving, from the BS, a third UL sounding configuration message that sets a second sounding sub-band bitmap value to a value no greater than the maximum specifiable value and indicates UL-SRS placement in a third sounding channel set of sub-bands associated with a third sounding channel, the third sounding channel set of sub-bands comprising at least one of the first sounding channel set of sub-bands or the second sounding channel set of sub-bands, the third sounding channel configured to be a third uplink sounding slot comprising at least the one OFDM symbol in a third uplink sub-frame in order to carry one or more UL-SRSs corresponding to at least one transmit beam of a third set of transmit beams, the third set of transmit beams comprises at least a subset of the first set of transmit beams or the second set of transmit beams; and
transmitting, through the third sounding channel set of sub-bands to the BS, the one or more UL-SRSs corresponding to at least the one transmit beam of the third set of transmit beams for channel estimation over a third data bandwidth, wherein the third data bandwidth is at least one of the subset of the first data bandwidth or a subset of the second data bandwidth.

12. The method of claim 9, wherein at least the first set of transmit beams for at least the first sounding channel is identified by a random access channel (RACH).

13. A mobile station (MS) for use in a wireless network, the MS comprising:
at least one processing device configured to:
receive, from a base station (BS), a first uplink (UL) sounding configuration message that sets a sounding sub-band bitmap value to a maximum specifiable value and indicates uplink sounding reference symbol (UL-SRS) placement in a first sounding channel set of sub-bands associated with a first sounding channel, the first sounding channel set of sub-bands comprising one or more sub-bands that cover a first data bandwidth, the first sounding channel configured to be an uplink sounding slot comprising at least one orthogonal frequency-division multiplexing (OFDM) symbol in an uplink sub-frame in order to carry one or more UL-SRSs corresponding to at least one transmit beam of a first set of transmit beams in the first sounding channel set of sub-bands;
initiate transmission, through the first sounding channel set of sub-bands to the BS, of the one or more UL-SRSs corresponding to at least the one transmit beam of the first set of transmit beams for channel estimation over the first data bandwidth;
receive, from the BS, a second UL sounding configuration message that sets a second sounding sub-band bitmap value to a value no greater than the maximum specifiable value and indicates UL-SRS placement in a second sounding channel set of sub-bands associated with a second sounding channel, the second sounding channel set of sub-bands comprising at least the first sounding channel set of sub-bands, the second sounding channel configured to be a second uplink sounding slot comprising at least the one OFDM symbol in a second uplink sub-frame in order to carry one or more UL-SRSs corresponding to at least one transmit beam of a second set of transmit beams, wherein the second set of transmits beams comprises at least a subset of the first set of transmit beams used in the first sounding channel; and
transmit, through the second sounding channel set of sub-bands to the BS, the one or more UL-SRSs corresponding to at least the one transmit beam of the second set of transmit beams for channel estimation over a second data bandwidth, wherein the second data bandwidth is at least a subset of the first data bandwidth.

14. The MS of claim 13, wherein the at least one processing device is further configured to receive a sounding channel index value, the sounding channel index value providing an indication of the sounding sub-band bitmap value and the UL-SRS configuration in the first sounding channel set of sub-bands.

15. The MS of claim 13, wherein the at least one processing device is further configured to:
receive, from the BS, a third UL sounding configuration message that sets a second sounding sub-band bitmap value to a value no greater than the maximum specifiable value and indicates UL-SRS placement in a third sounding channel set of sub-bands associated with a third sounding channel, the third sounding channel set of sub-bands comprising at least one of the first sounding channel set of sub-bands or the second sounding channel set of sub-bands, the third sounding channel configured to be a third uplink sounding slot comprising at least the one OFDM symbol in a third uplink sub-frame in order to carry one or more UL-SRSs corresponding to at least one transmit beam of a third set of transmit beams, the third set of transmit beams comprising at least a subset of the first set of transmit beams or the second set of transmit beams; and
transmit, through the third sounding channel set of sub-bands to the BS, the one or more UL-SRSs corresponding to at least the one transmit beam of the third set of transmit beams for channel estimation over a third data bandwidth, wherein the third data bandwidth is at least a subset of the first data bandwidth or the second data bandwidth.

16. The MS of claim 13, wherein at least the first set of transmit beams for at least the first sounding channel is identified by a random access channel (RACH).

* * * * *